United States Patent
Ohta et al.

[11] Patent Number: 6,111,625
[45] Date of Patent: Aug. 29, 2000

[54] ACTIVE MATRIX TYPE LIQUID CRYSTAL DISPLAY DEVICE

[75] Inventors: Masuyuki Ohta, Mobara; Katsumi Kondo, Hitachinaka, both of Japan

[73] Assignee: Hitachi, Ltd., Tokyo, Japan

[21] Appl. No.: 08/921,556

[22] Filed: Sep. 2, 1997

[30] Foreign Application Priority Data

Sep. 2, 1996 [JP] Japan ................................. 8-231660

[51] Int. Cl.$^7$ ................................................ G02F 1/1343
[52] U.S. Cl. .......................................... 349/141; 349/117
[58] Field of Search .............................. 349/141, 99, 143, 349/139, 123, 185, 75, 117, 76

[56] References Cited

U.S. PATENT DOCUMENTS

| | | | |
|---|---|---|---|
| 5,150,234 | 9/1992 | Takahashi et al. | 359/65 |
| 5,196,953 | 3/1993 | Yeh et al. | 349/117 |
| 5,243,451 | 9/1993 | Kanemoto et al. | 359/53 |
| 5,576,867 | 11/1996 | Baur et al. | 359/87 |
| 5,598,285 | 1/1997 | Kondo et al. | 349/39 |
| 5,650,833 | 7/1997 | Akatsuka et al. | 349/118 |
| 5,956,111 | 9/1999 | Ohta et al. | 349/141 |

FOREIGN PATENT DOCUMENTS

| | | | |
|---|---|---|---|
| 54-42163 | 4/1979 | Japan | 349/141 |

*Primary Examiner*—James A. Dudek
*Attorney, Agent, or Firm*—Antonelli, Terry, Stout & Kraus, LLP

[57] ABSTRACT

An active matrix type liquid crystal display device in which the image display is controlled by an electric field parallel to the substrate surface, and which is capable of realizing a wide viewing angle comparable to that of a CRT and a response speed fast enough to display a dynamic image. For this purpose, the liquid crystal display device includes a pair of insulating substrates so disposed as to face each other; a pair of orientation films formed over the insulating substrates; a liquid crystal composition held between the pair of orientation films; and pixel electrodes and counter electrodes to apply a lateral electric field almost parallel to surfaces of the substrates. The initial orientation direction on one orientation film side and the initial orientation direction on the other orientation film side are line symmetric with respect to the direction of the lateral electric field.

36 Claims, 29 Drawing Sheets

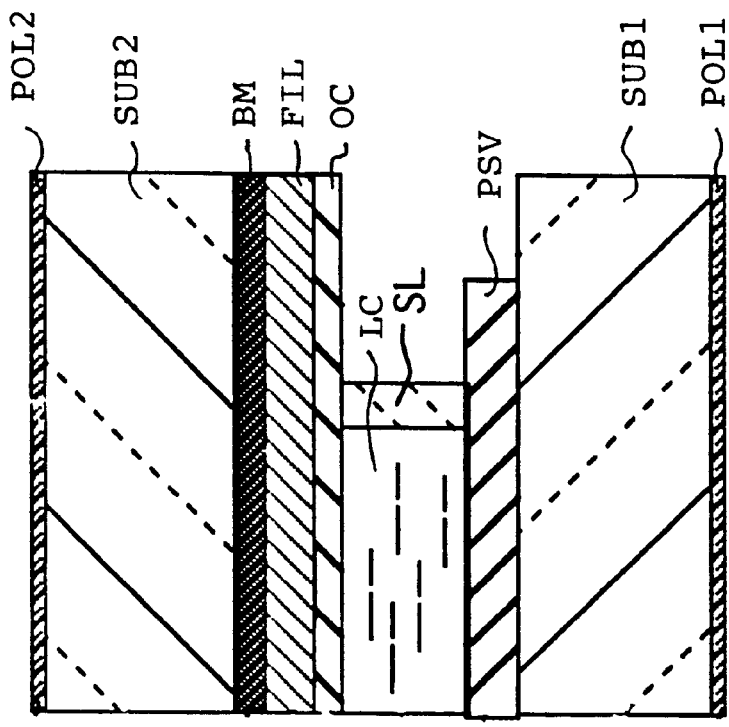
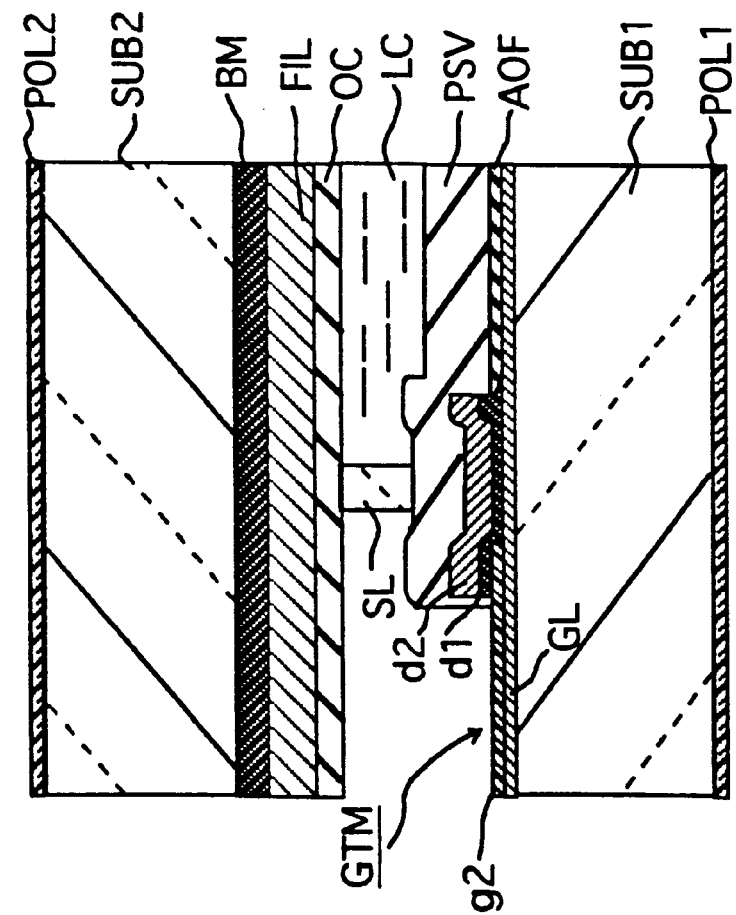
FIG. 6(a)
FIG. 6(b)

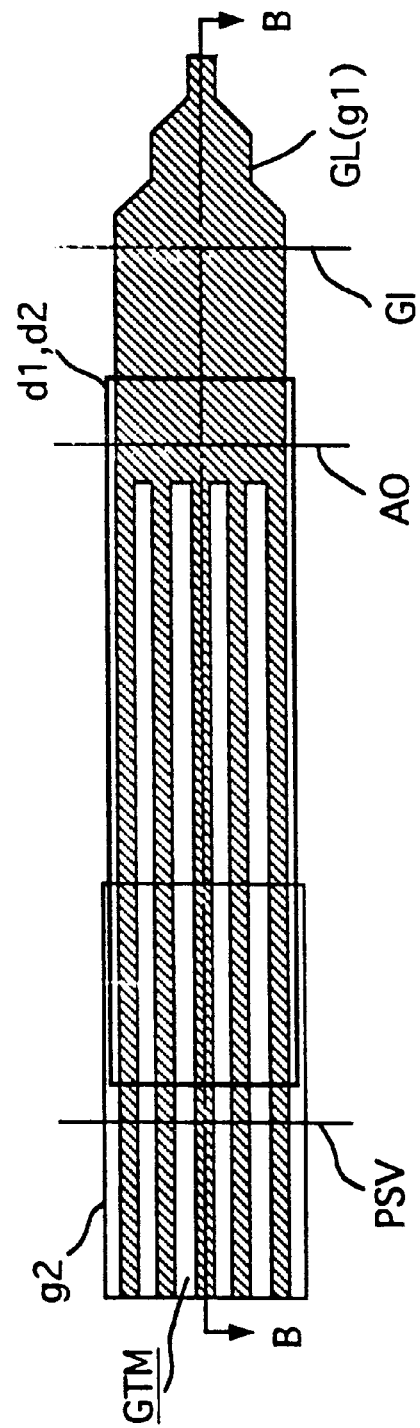
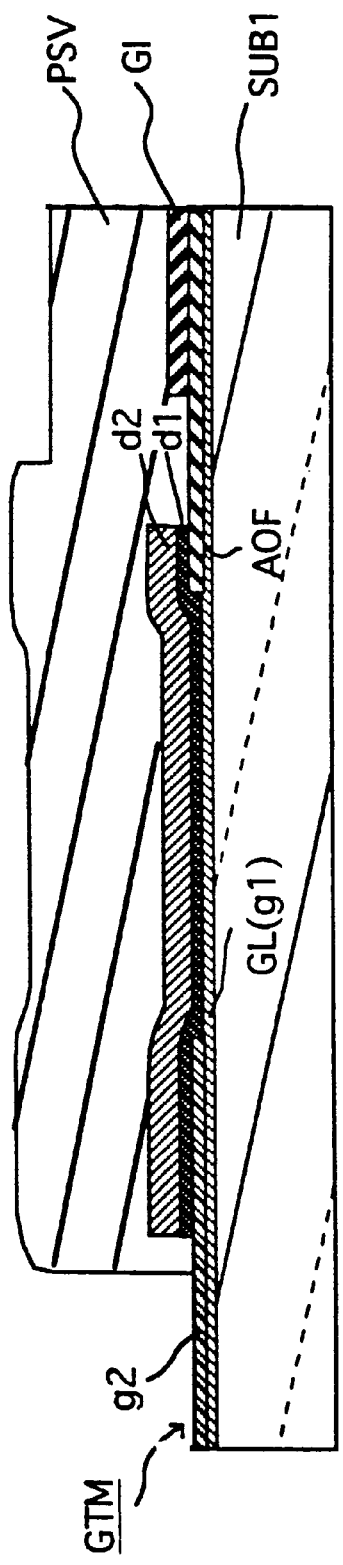
FIG. 7(A)
FIG. 7(B)

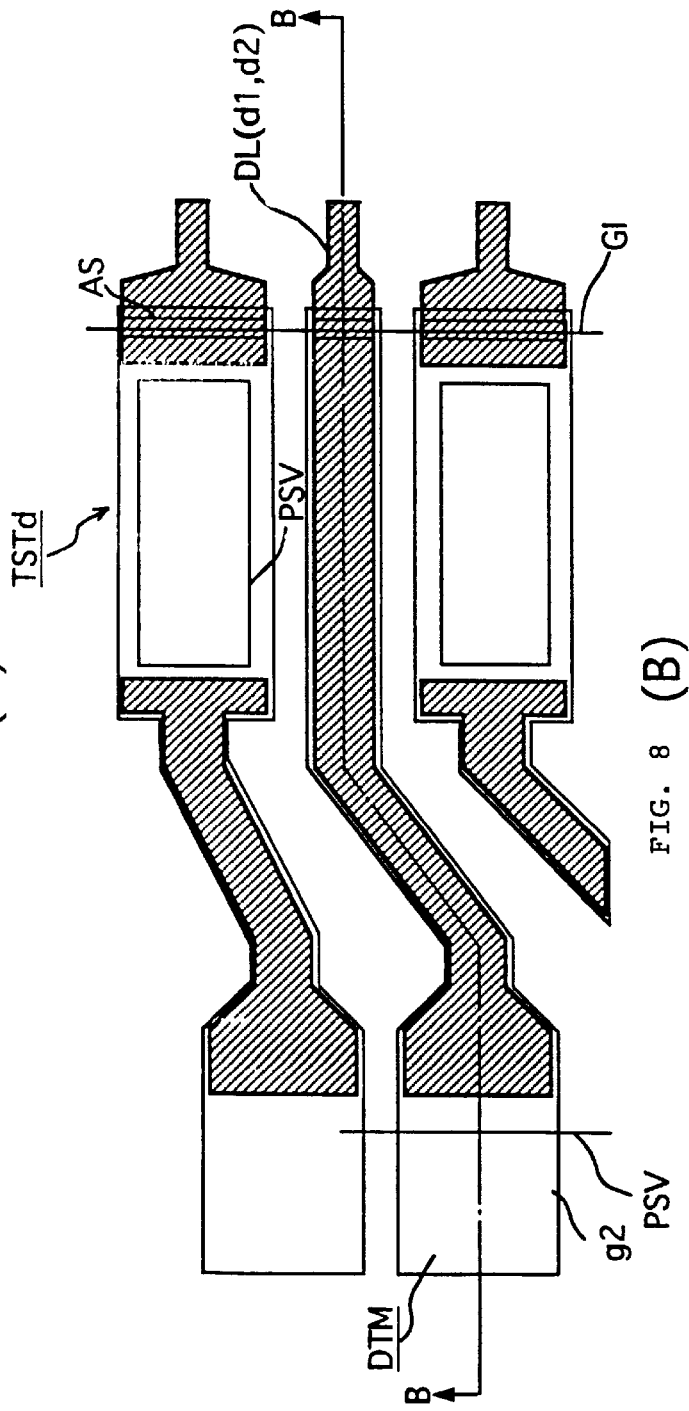
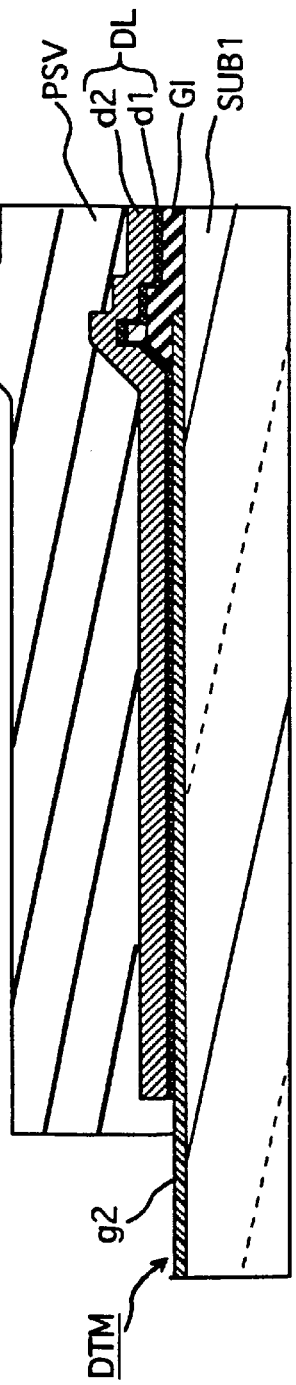
FIG. 8(A)
FIG. 8(B)

State of voltage OFF (High penetration rate)

State of voltage ON (Low penetration rate)

State of voltage OFF (High penetration rate)

State of voltage ON (Low penetration rate)

Liquid Crystal cell for drive

Liquid Crystal cell for amend

State of voltage OFF (High penetration rate)

State of voltage ON (Low penetration rate)

Liquid Crystal cell for drive

Lagging axis of phase shifter

State of voltage OFF (Low Penetration rate)

State of voltage ON (High Penetration rate)

ACTIVE MATRIX TYPE LIQUID CRYSTAL DISPLAY DEVICE

BACKGROUND OF THE INVENTION

The present invention relates to a liquid crystal display device and more particularly to an active matrix type liquid crystal display device using thin-film transistors.

Active matrix type liquid crystal display devices using active devices represented by thin-film transistors (TFTs) are beginning to find wide use as display terminals for office automation equipment thanks to such features as their thinness, light weight and high display quality, compared to that of a CRT. The display methods of the liquid crystal display device can be classified largely into two categories. In one method, a liquid crystal is held between two substrates each having transparent electrodes and the liquid crystal is activated by a voltage applied to the transparent electrodes to modulate light that has passed through the transparent electrodes and has entered the liquid crystal to display an image. Most of the liquid crystal display products currently in use adopt this method. In another method, the liquid crystal is activated by an electric field virtually parallel to a substrate surface between two electrodes formed on the substrate to modulate the light entering the liquid crystal from a gap between the two electrodes (hereinafter referred to as a lateral field method). This has an advantage of providing a significantly wide viewing angle and is a prospective technique for use in connection with an active matrix type liquid crystal display device. The features of the latter method are described mainly in a Published Japanese Translation of PCT Patent Application from another state No. 505247/1993, Japanese Patent Publication No. 21907/1988 and Japanese Patent Laid-Open No. 160878/1994.

The active matrix type liquid crystal display device described in the above patent application in connection with the lateral field method (also called an in-plane switching method), however, has a response speed of about 100 ms at the fastest, far from the requirement of less than 40–20 ms for the display of dynamic images. Therefore, this type of liquid crystal display device has the drawback that, when a dynamic image is displayed, a residual image is retained making the dynamic image look like a comet with a tail. The response time is defined as the sum of the rise time at the time of voltage application and the fall time at the time of voltage turn-off and will be detailed in the following.

The known lateral field method has the following two types of configuration.

The first known configuration has the liquid crystal molecules in a liquid crystal layer initially orientated in the same direction as the electric field application direction on the interface of the liquid crystal layer on the upper substrate side and, on the interface on the lower substrate side, they are orientated about 90 degrees from the electric field application direction so that the liquid crystal molecules are twisted about 90 degrees when the voltage is turned off. The liquid crystal molecules in this state are turned about 90 degrees in the electric field application direction at the interface on the lower substrate side by an electric field which is almost parallel to the substrate surface generated by two electrodes (referred to as a lateral field) to eliminate their optical rotary power and thereby change their transmittance to display an image.

This configuration, however, needs to rotate the liquid crystal molecules near the interface with the lower substrate by as much as about 90 degrees, and, therefore, the drive voltage may easily become extremely high, higher than 10 v. As for the response speed of this configuration, although the rise time can be made faster to some extent, the fall time becomes at least 40 ms because the liquid crystal molecules must turn back through 90 degrees. This response is not fast enough for displaying a dynamic image.

In the second known configuration the liquid crystal molecules in the liquid crystal layer at the interfaces with the upper and lower substrate are initially orientated almost in the same direction so that they are homogeneously orientated without any twist, when the voltage is turned off. The liquid crystal molecules in this state are wholly rotated about 45 degrees in the electric field direction by the lateral field, when the molecules have a positive dielectric anisotropy. When they have a negative dielectric anisotropy, they are rotated in a direction perpendicular to the electric field to change the birefringent index of the liquid crystal layer at that time and, therefore, to change the transmittance to display an image.

The second known configuration can reduce the drive voltage to about 5 V, i.e. lower than that of the first configuration, which is in a practical range except for rapidly changing, specific dynamic pictures.

In the second known configuration, the response speed depends greatly on the thickness of the liquid crystal layer between the upper and lower substrates and is faster as the liquid crystal layer thickness becomes smaller. When the gap between the substrates is made too narrow, the gap uniformity becomes difficult to maintain, with an increased chance of display variations occurring. There is another problem that the process of injecting the liquid crystal is slow, taking too long a time. Considering these factors, the liquid crystal layer has a practical thickness limit of about 4 $\mu$m. The response speed therefore has been some 60 ms at the fastest.

Examples of the first known configuration are described in G. Baur et al, JAPAN DISPLAY 1992, PP.547–550, or by R. A. Soref, Journal of Applied Physics, Vol. 45, No. 12, December 1974, PP. 5466–5468, or by R. A. Soref, Proceedings of the IEEE, December 1974, PP. 1710–1711. An example of the second known configuration is found in ASIA DISPLAY 1995, PP. 577–580 by M. Ohe et al.

SUMMARY OF THE INVENTION

An object of this invention is to provide an active matrix type liquid crystal display device which has a wide viewing angle, compared to that of a CRT, and a response which is fast enough to display a dynamic image.

A typical configuration of this invention is one in which the liquid crystal molecules in the liquid crystal layer are initially orientated about 45 degrees from the voltage application direction at the interface with the upper substrate and, at the interface with the lower substrate, they are orientated about 45 degrees from the voltage application direction so that the liquid crystal molecules are twisted by some 90 degrees when the voltage is turned off. For ease in understanding, the initial orientation angle is defined as positive for a counterclockwise rotation with respect to the in-plane direction of the lateral field and ranges from −90 degrees to 90 degrees.

To display an image, the liquid crystal molecules in this state are rotated by the lateral field about −45 degrees in the electric field direction at the interface with the upper substrate and, at the interface with the lower substrate, they are rotated about 45 degrees in the electric field direction to eliminate their birefringence and thereby change their transmittance, forming an image.

In this configuration according to the invention, the liquid crystal molecules near the interfaces with the upper and lower substrates need only to be turned about 45 degrees respectively in opposite directions, which can be realized by a lower voltage than that of the above-mentioned first known configuration. Further, because this configuration of the present invention comprises two liquid crystal layers stacked together, each twisted by 45 degrees about the center of the liquid crystal layer in opposite directions, the configuration is identical to one in which the gap between the substrates is reduced to about one-half. That is, the liquid crystal molecules in two stacked layers, because their activation-force is associated with the elastic relation among the liquid crystal molecules in each layer, are identical to one having virtually one-half the liquid crystal layer thickness in terms of activation of the molecules.

In the case of the above-mentioned first known configuration, like the second known configuration, the response speed becomes faster as the liquid crystal layer thickness decreases, i.e., the response speed is approximately inversely proportional to the square of the liquid crystal layer thickness. Further, because the liquid crystal layer according to the invention rotates only 45 degrees, compared to 90 degrees in the first known configuration, the response is about two times faster than that of the first known configuration. In theory, the configuration of this invention can achieve a response speed up to about eight times that of the prior art.

Assuming that the fall time in the first known configuration is about 45 ms, the configuration of this invention can theoretically realize a fall time of about 6 ms. Measurements show that this embodiment of the invention achieved a response speed of about 20 ms. Further, no reduction in the response speed resulted, as has been observed in the conventional configurations, during a half-tone display, and an almost constant, fast response speed was obtained at any applied voltage.

BRIEF DESCRIPTION OF THE DRAWINGS

This invention and further objects and features of this invention will become apparent from the following description, when taken with reference to the accompanying drawings, wherein:

FIG. 6(a) is a cross section showing the scanning signal terminal and FIG. 6(b) is a cross section showing the panel edge portion with no external connection terminal on the right side.

FIG. 7(A) is a plan view and FIG. 7(B) is a cross-sectional view showing the connecting portion of the gate terminal GTM and the gate line GL.

FIG. 8(A) plan view and FIG. 8(B) is a cross-sectional view showing the connecting portion of the drain terminal and the video signal line DL.

DESCRIPTION OF THE PREFERRED EMBODIMENTS

Embodiment 1

Figure 1:
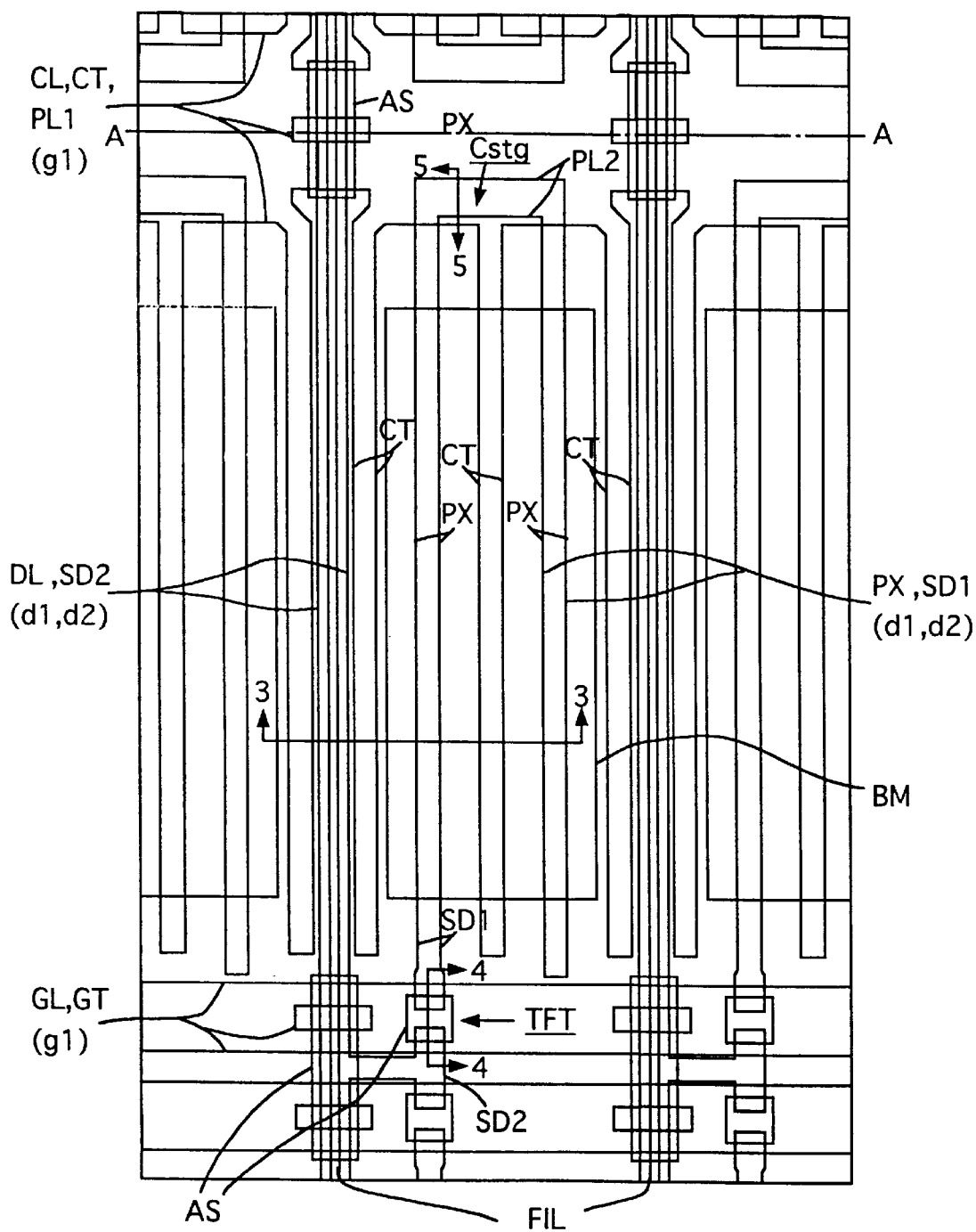
FIG. 1 is a plan view showing one pixel and its peripheral area in the liquid crystal display portion of an active matrix type color liquid crystal display device according to this invention.

An embodiment of an active matrix type color liquid crystal display device to which this invention is applied will be described in the following. In the drawings, parts having identical functions are denoted by like reference numbers and their descriptions will not be repeated.

FIG. 1 is a plan view showing one pixel and its peripheral portion in an active matrix type color liquid crystal display device. As shown in FIG. 1, each pixel is arranged inside an intersection area (an area enclosed by four signal lines) enclosed by a scanning signal line (gate electrode line or horizontal signal line) GL, a counter voltage line (counter electrode wiring) CL, and two adjoining video signal lines (drain signal line or vertical signal line) DL. Each pixel includes a thin-film transistor TFT, a storage capacitor Cstg, a pixel electrode PX and a counter electrode CT. Two or more sets of the scanning signal line GL and the counter voltage line CL extending in the lateral direction are arranged in the vertical direction in the figure. A plurality of the video signal lines DL extending in the vertical direction are arranged in the lateral direction. The pixel electrode PX is connected to the thin-film transistor TFT, and the counter electrode CT is formed integrally with the counter voltage line CL.

Two pixels adjoining each other vertically along the video signal lines DL, when they are folded along the line A of FIG. 1, overlap with each other in their planar configurations. This is to allow the counter voltage line CL to be shared by the two vertically adjoining pixels along the video signal lines DL and thereby increase the width of the counter voltage line CL to reduce its resistance, allowing a sufficient counter voltage to be supplied to each counter electrode CT of the laterally aligned pixels from an external circuit.

The pixel electrode PX and the counter electrode CT oppose each other to form an electric field between them to control the optical state of the liquid crystal LC and therefore produce an image display. The pixel electrode PX and the counter electrode GT are formed like teeth of a comb, each forming a narrow electrode extending vertically with respect to the plane of the drawing.

In each pixel, the number of counter electrodes CT (the number of comb teeth) O and the number of pixel electrodes PX (the number of comb teeth) P have the relation of O=P+1 (in this embodiment, O=3, P=2). This relationship is adopted to arrange the counter electrodes CT and the pixel electrodes PX alternately and to ensure that the counter electrodes CT are close to the video signal lines DL. This arrangement is designed to shield the video signal lines DL from the electric lines of force by means of the counter electrodes CT to prevent the electric field between the counter electrode CT and the pixel electrode PX from being influenced by the electric field from the video signal lines DL. The counter electrode CT has a stable potential because it is supplied at all times by the external circuit through the counter voltage line CL to be described later. Hence, the potential of the counter electrode CT shows almost no variation even if it is close to the video signal lines DL. This arrangement sets the pixel electrode PX at a position geometrically remote from the video signal lines DL, resulting in a significant reduction in parasitic capacitance between the pixel electrode PX and the video signal lines DL, while at the same time suppressing variations of the pixel electrode potential Vs caused by the video signal voltage. It is therefore possible to minimize crosstalk (image quality degradations called vertical smear) that occur in the vertical direction.

The widths of the pixel electrode PX and the counter electrode CT are each set at 6 $\mu$m. This value is chosen because these widths need to be set larger than the thickness of the liquid crystal layer which, as will be described later, is 5.0 $\mu$m, to allow a sufficient electric field to be applied to the whole liquid crystal layer in the direction of its thickness, and the widths also need to be set as narrow as possible to increase the aperture ratio. To prevent line disconnection, the width of the video signal lines DL is set to 8 $\mu$m, slightly wider than the pixel electrode PX and the counter electrode CT. Here, the width of the video signal lines DL is set to be less than two times the width of the adjoining counter electrode CT. Alternatively, when the width of the video signal lines DL is already determined from the productivity or yield, the width of the counter electrode CT adjoining the video signal lines DL is set to be more than one-half the width of the video signal lines DL. This is to cause the electric lines of force generated by the video signal lines DL to be absorbed by the counter electrodes CT on both sides. To absorb electric lines of force generated by an electrode of a certain width requires another electrode of an equal or greater width. Because the electric lines of force generated by a part which is one-half the width of the video signal line DL (4 $\mu$m each) need to be absorbed by the counter electrode CT on one side, the width of the counter electrodes CT adjoining the video signal lines DL is set to be more than one-half the width of the video signal lines DL. This prevents crosstalk, particularly vertical smear, caused by the effects of the signal electrode.

The width of the scanning signal line GL is determined so as to satisfy the resistance value at which a sufficient scanning voltage is applied to a gate electrode GT of a pixel on the terminal side (on the opposite side of a scan signal terminal GTM described later). The width of the counter voltage line CL is also set to meet the resistance value at which a sufficient counter voltage is applied to the counter electrode CT of a pixel on the terminal side (on the opposite side of a common bus line CB, as will be described later).

The distance between the pixel electrode PX and the counter electrode CT is changed according to the liquid crystal material for the reason described below. Since the electric field strength capable of attaining maximum transmittance differs among liquid crystal materials, the electrode-to-electrode distance is set according to the liquid crystal material so that the maximum transmittance can be obtained within the range of the maximum amplitude of the electrode voltage determined by the withstand voltage of the signal electrode drive circuit (a driver on the electrode side). Using a liquid crystal material to be described later, the electrode interval is 16 μm.

While this embodiment arranges all the electrodes on the TFT substrate side, some electrodes, particularly the counter electrode CT and the counter voltage line CL, may be placed on the counter substrate side. This arrangement also falls in the scope of this invention.

There is no particular limitation on the direction of the counter electrode CT. While, in this embodiment, the counter electrode CT is arranged in the same direction as the gate signal line GL, it may extend in the same direction as the drain signal line DL or be arranged in the form of a matrix. All of these arrangements fall within the scope of this invention.

Figure 2:
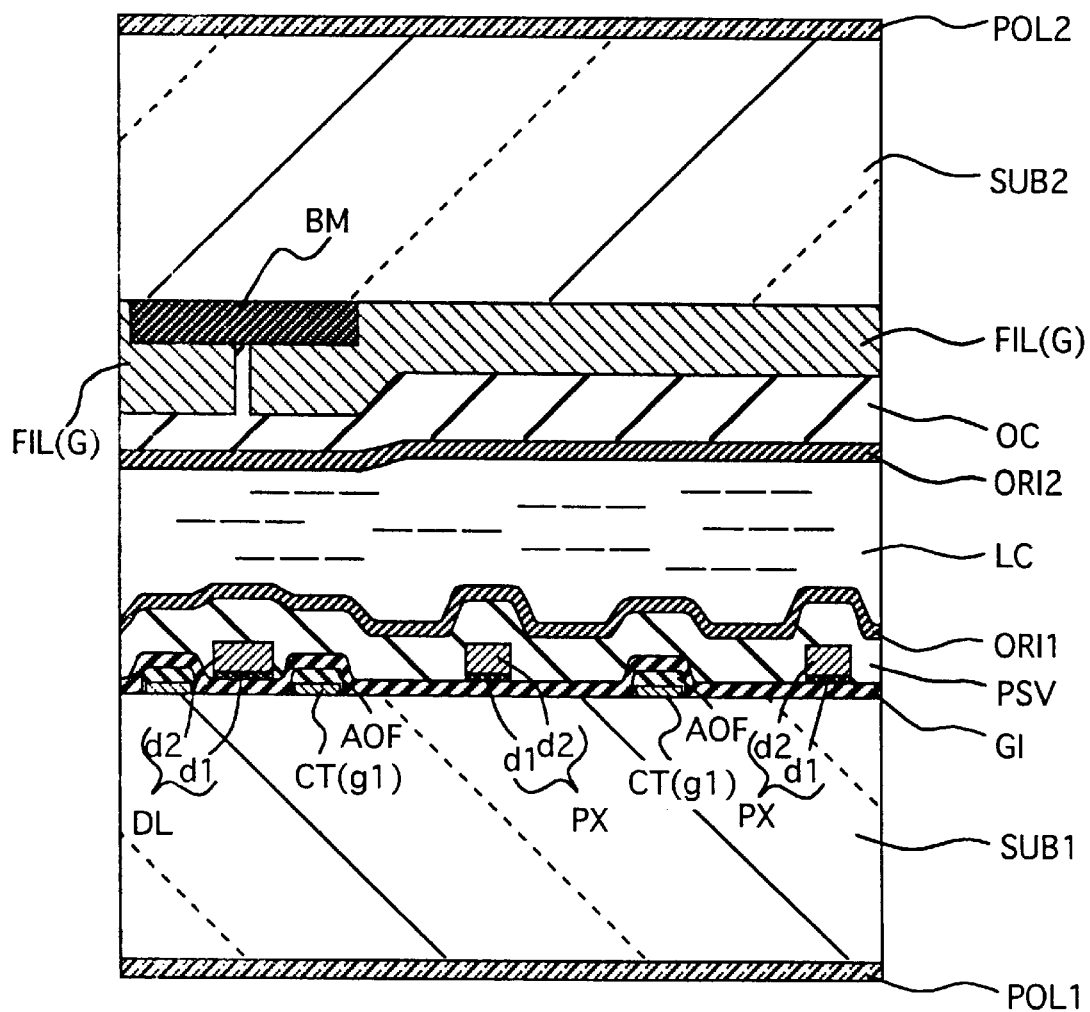
FIG. 2 is a cross section of the pixel taken along the line 3—3 of FIG. 1.
Figure 3:
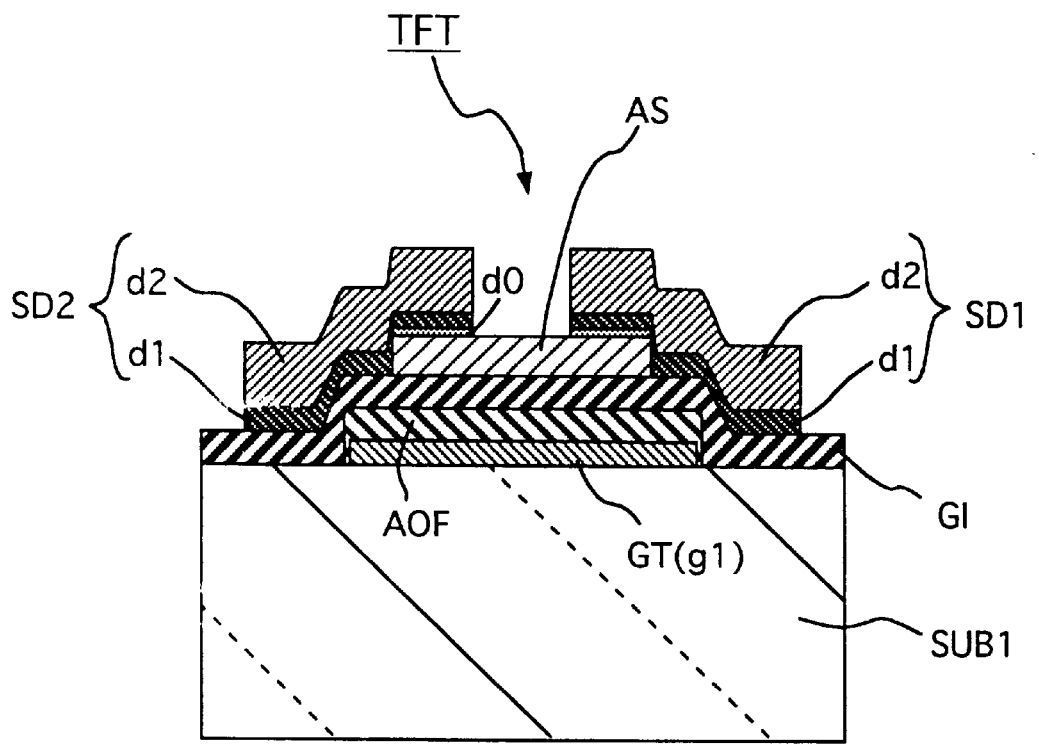
FIG. 3 is a cross section of the thin-film transistor TFT taken along the line 4—4 of FIG. 1.
Figure 4:
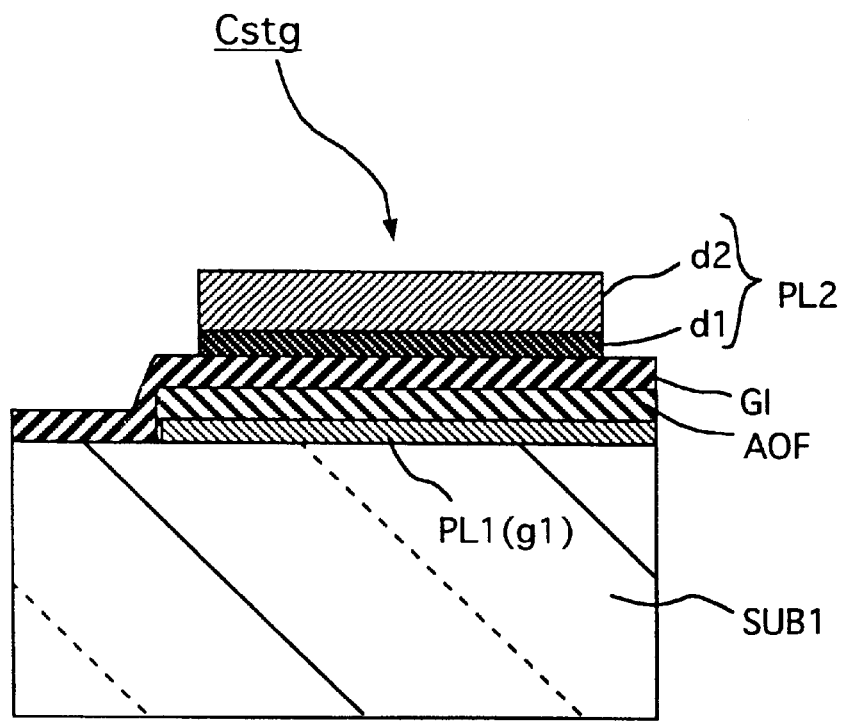
FIG. 4 is a cross section of the storage capacitor Cstg taken along the line 5—5 of FIG. 1.

FIG. 2 shows a cross section taken along the line 3—3 of FIG. 1. FIG. 3 shows a cross section of a thin-film transistor TFT taken along the line 4—4 of FIG. 1. FIG. 4 shows a cross section of a storage capacitor Cstg taken along the line 5—5 of FIG. 1. As shown in FIGS. 2 to 4, there are a lower transparent glass substrate SUB1 and an upper transparent glass substrate SUB2 with the liquid crystal layer LC interposed between. On the lower transparent glass substrate SUB1 are formed a thin-film transistor TFT, a storage capacitor Cstg and other electrodes. On the upper transparent glass substrate SUB2 are formed a color filter FIL and a black matrix pattern BM for light shielding.

On the inner side (liquid crystal LC side) of each of the transparent glass substrates SUB1, SUB2, alignment or orientation films ORI1, ORI2 are formed that control the initial orientation of the liquid crystal. On the outer side of each of the transparent glass substrates SUB1, SUB2 are placed polarizors whose polarizing axes are crossed perpendicularly (crossed-Nicols arrangement).

First, the configuration of the lower transparent glass substrate SUB1 (TFT substrate) will be described in detail. The thin-film transistor TFT operates in such a way that its channel resistance between the source and the drain decreases when a positive bias is applied to the gate electrode GT and, when the bias is set to zero, the channel resistance increases.

As shown in FIG. 3, the thin-film transistor TFT has an i-type (intrinsic, meaning no conductivity type determining impurities are introduced) semiconductor layer AS comprising a gate electrode GT, a gate insulating film GI and an i-type amorphous silicon (Si), a pair of source electrodes SD1 and a pair of drain electrodes SD2. The source and the drain are determined essentially by the bias polarity between them, and in the circuit of this liquid crystal display device, the bias polarity is reversed during operation, and thus it should be understood that the source and the drain functions switch with respect to each other during the operation. In the following description, however, one of them is assumed to be fixed as a source and the other is assumed to be a drain for convenience of description.

The gate electrode GT is formed continuously with the scanning signal line GL so that a part of the scanning signal line GL forms the gate electrode GT. The gate electrode GT is a part extending beyond an active region of the thin-film transistor TFT and is formed so as to be slightly larger than the i-type semiconductor layer AS so as to completely cover it (when viewed from below). In addition to the function of a gate electrode, the gate electrode GT serves to protect the i-type semiconductor layer AS from external light and backlight. In this example, the gate electrode GT is formed of a single layer of a conductive film g1. The conductive film g1 may be an aluminum (Al) film formed by sputtering. Over the conductive film g1 is formed an anodic oxide film AOF of aluminum.

The scanning signal line GL is formed of the conductive film g1. The conductive film g1 forming this scanning signal line GL is made by the same manufacturing process as the conductive film g1 of the gate electrode GT and is formed integrally with it. Through the scanning signal line GL a gate voltage Vg is supplied from an external circuit to the gate electrode GT. The anodic oxide film AOF of aluminum is also formed over the scanning signal line GL. The part of the scanning signal line GL that crosses the video signal lines DL is formed to be narrow to reduce the probability of a short-circuit with the video signal lines DL and is bifurcated so that it can be cut by laser trimming even when a short-circuit occurs.

The counter electrode CT is formed of a conductive film g1 that is in the same layer as the gate electrode GT and the scanning signal line GL. The aluminum anodic oxide film AOF is formed over the counter electrode CT, too. The counter electrode CT is supplied with a counter voltage Vcom. In this embodiment, the counter voltage Vcom is set at a potential which is lower by the amount of a field through voltage ΔVs than an intermediate DC potential between a minimum level drive voltage Vdmin and a maximum level drive voltage Vdmax applied to the video signal lines DL, the field-through voltage ΔVs being generated when the thin-film transistor TFT is turned off. When it is necessary to reduce the power supply voltage of the integrated circuit used in the signal electrode drive circuit by half, an AC voltage needs to be applied.

The counter voltage line CL is formed of a conductive film g1. The conductive film g1 of the counter voltage line CL is deposited in the same manufacturing process for producing the conductive film g1 of the gate electrode GT, the scanning signal line GL and the counter electrode CT, and is formed integrally with the counter electrode CT. Through this counter voltage line CL, the counter voltage Vcom is supplied from the external circuit to the counter electrode CT. An aluminum anodic oxide film AOF is also formed over the counter voltage line CL. The part of the counter voltage line CL that crosses the video signal lines DL is, like the scanning signal line GL, formed to be narrow to reduce the probability of a short-circuit with the video signal lines DL and is bifurcated so that it can be cut by laser trimming even when a short-circuit occurs.

In the thin-film transistor TFT, the insulating film GI is used as a gate insulating film to apply an electric field to the semiconductor layer AS as well as the gate electrode GT. The insulating film GI is formed over the gate electrode GT and the scanning signal line GL. The insulating film GI may be a silicon nitride film deposited to a thickness of 1200 to 2700 angstrom (Å) (in this embodiment, about 2400 Å) by, for instance, a plasma chemical vapor deposition. The gate insulating film GI is formed so as to enclose the whole matrix area AR, with its peripheral portion removed to expose external connection terminals DTM, GTM. The insulating film GI serves also as electric insulation between the scanning signal line GL or counter voltage line CL and the video signal lines DL.

The i-type semiconductor layer AS is made of amorphous silicon and is deposited to a thickness of 200 to 2200 Å (in this embodiment, about 2000 Å). A layer d0 is an N(+) amorphous silicon semiconductor layer doped with phosphorus (P) for ohmic contact, and is left only where there is an i-type semiconductor layer AS below and a conductive layer d1 (d2) above.

The i-type semiconductor layer AS is also provided between the scanning signal line GL or counter voltage line CL and the video signal lines DL at their intersections (crossover portions). The i-type semiconductor layer AS at the crossover portions reduces the possibility of a short-circuit between the scanning signal line GL or counter voltage line CL and the video signal lines DL.

The source electrode SD1 and the drain electrode SD2 are each formed of a conductive film d1 in contact with the N(+) semiconductor layer d0 and a conductive film d2 formed over the first conductive film d1.

The conductive film d1 is made of chromium (Cr) by sputtering to a thickness of 500–1000 Å (in this embodiment, about 600 Å). The Cr film has an increased stress when formed to a greater thickness and therefore its thickness is limited to about 2000 Å at most. The Cr film is used (as a so-called barrier layer) to ensure a satisfactory adhesion with the N(+) semiconductor layer d0 and to prevent the aluminum of the conductive film d2 from diffusing into the N(+) semiconductor layer do. In addition to a Cr film, the conductive film d1 may be a high melting point metal (Mo, Ti, Ta, W) film or a high melting point silicide ($MoSi_2$, $TiSi_2$, $TaSi_2$, $WSi_2$) film.

The conductive film d2 is formed by sputtering aluminum to a thickness of 3000–5000 Å (in this embodiment, about 4000 Å). The aluminum film has smaller stresses than the Cr film and can be formed to a greater thickness, thus reducing the resistances of the source electrodes SD1, drain electrodes SD2 and video signal lines DL, while also improving the step coverage and ensuring the extension over the steps formed due to the formation of the gate electrode GT and i-type semiconductor layer AS.

The conductive film d1 and conductive film d2 are patterned with the same mask pattern, and then, by using the same mask or by using the conductive film d1 and conductive film d2 as masks, the N(+) semiconductor layer d0 is removed. That is, the N(+) semiconductor layer d0 remaining on the i-type semiconductor layer AS is removed in a self-alignment manner in the portions other than the conductive film d1 and conductive film d2. At this time, because the N(+) semiconductor layer d0 is etched away to its full thickness, the i-type semiconductor layer AS is also etched slightly at the surface. The degree of the etching can be controlled by controlling the etching time.

The video signal lines DL are formed of a source electrode SD1, a second conductive film in the same layer as the source electrode SD1, and a third conductive film d3. The video signal lines DL are formed integrally with the drain electrode SD2. The pixel electrode PX is formed of a source electrode SD1, a second conductive film in the same layer as the source electrode SD1, and a third conductive film d3. The pixel electrodes PX are formed integrally with the source electrode SD1.

At its end opposite to the end connected to the thin-film transistor TFT, the pixel electrode PX is so formed so as to overlap with the counter voltage line CL. This overlapping, as can be seen from FIG. 4, forms a storage capacitor (a capacitive device) Cstg having the pixel electrode PX as one electrode PL2 and the counter voltage line CL as another electrode PL1. The dielectric film of the storage capacitor Cstg is formed of the insulating film GI used as a gate insulating film of the thin-film transistor TFT and the anodic oxide film AOF. As shown in the plan view of FIG. 1, the storage capacitor Cstg is formed in a region where the width of the conductive film g1 of the counter voltage line CL is enlarged.

Over the thin-film transistor TFT is formed a passivation layer PSV1, which has a primary function of protecting the thin-film transistor TFT against moisture and is made of a highly transparent and moisture-resistant material. The passivation layer PSVL may be formed of a silicon oxide layer or silicon nitride layer deposited by a plasma CVD device to a thickness of about 1 μm.

The passivation layer PSV1 is formed to enclose the entire matrix area AR with its peripheral portion removed to expose the external connection terminals DTM, GTM. As to the thickness of the passivation layer PSV1 and the gate insulating film GI, the former is made thick for good protection and the latter is made thin in consideration of the mutual conductance gm of the transistor. Hence, the passivation layer PSV1 with a high protecting capability is formed to be larger than the gate insulating film GI to protect it over as wide an area as possible at the peripheral portion as well.

Next, referring back to FIGS. 1 and 2, the configuration of the upper transparent glass substrate SUB2 (color filter substrate) will be described in detail.

On the upper transparent glass substrate SUB2 is formed a light shielding film BM (generally called a black matrix) that prevents transmitted light from passing through unwanted gaps (other than the gaps between the pixel electrode PX and the counter electrode CT) toward the display surface and degrading the contrast. The light shielding film BM also serves to prevent external light or backlight from entering the i-type semiconductor layer AS. That is, the i-type semiconductor layer AS of the thin-film transistor TFT is sandwiched by the upper and lower light shielding films BM and the slightly larger gate electrode GT, and is thus protected against external natural light and backlight.

A closed polygonal contour line of the light shielding film BM shown in FIG. 1 represents an aperture inside of which the light shielding film BM is not formed. This contour line pattern is just one example. The boundary line in the vertical direction of the figure is determined according to the precision of the alignment between the upper and lower substrates. When the alignment precision is better than the width of the counter electrode CT adjoining the video signal lines DL, setting the contour line within the width of the counter electrode allows the aperture to be enlarged.

The light shielding film BM is made of a film that has a light shielding capability and a high insulating capability, but will not influence the electric field between the pixel electrode PX and the counter electrode CT. In this embodiment, the light shielding film BM is made of a resist material mixed with black pigment and is formed to a thickness of about 1.2 μm.

The light shielding film BM is formed as a grid around each pixel to define an effective display area of each pixel. Thus, the contour of each pixel is made clear by the light shielding film BM. That is, the light shielding film BM has two functions, one as a black matrix and one as a light shielding means for the i-type semiconductor layer AS.

The light shielding film BM is also formed at the peripheral portion like a frame and its pattern is continuous with the pattern of the matrix area of FIG. 1 having a plurality of dot-like openings. The light shielding film BM at the peripheral portion extends to the outside of the seal portion SL to prevent light, such as reflected light produced in the apparatus equipped with the liquid display device, such as a personal computer, from entering the matrix area. The light shielding film BM is maintained at a distance of about 0.3–1.0 mm inside of the edge of the substrate SUB2, thereby avoiding the cut area of the substrate SUB2.

The color filter FIL comprises alternated red, green and blue stripe filters formed at portions facing the pixels. The color filter FIL overlaps the edge portion of the light shielding film BM. The color filter FIL can be formed as follows. First, on the surface of the upper transparent glass substrate SUB2, a dyeing base made of a material such as acrylic resin is formed and then removed in areas other than the red filter forming area by photolithography. Then, the dyeing base is colored with a red dye and fixed to form a red filter R. This is followed by a similar process to form a green filter G and a blue filter B.

The overcoating film OC is provided to prevent leakage of the dye of the color filter FIL into the liquid crystal LC and to planarize stepped portions formed by the color filter FIL and the light shielding film BM. The overcoating film OC may be made of a transparent resin material, such as acrylic resin or epoxy resin.

Next, the liquid crystal layer, orientation film and polarizer, which represents features of this invention, will be described.

The liquid crystal material is a nematic liquid crystal with a positive dielectric anisotropy $\Delta\epsilon$ of 10.2 and a refractive index anisotropy $\Delta n$ of 0.084 (589 nm at 20° C.). The liquid crystal layer has a thickness of 5.0 μm and a retardation $\Delta n \cdot d$ of 0.42 μm. With this retardation $\Delta n \cdot d$, it is possible to obtain the maximum contrast for the initial orientation angle and polarizer arrangement to be described later. That is, in Embodiment 1, the retardation $\Delta n \cdot d$ is so determined as to produce a display of 0-th order birefringence (first minimum) mode.

To realize the initial orientation state in which the liquid crystal is twisted by about 90 degrees, in this embodiment, about 0.1% of chiral material twisted clockwise is added to the liquid crystal from the upper substrate SUB2 to the lower substrate SUB1. The type of liquid crystal material LC to be employed is not particularly limited. It is noted, however, that the larger the dielectric anisotropy $\Delta\epsilon$ and the smaller the elastic constant K2 associated with twisting, the lower the drive voltage can be.

The thickness of the liquid crystal layer is controlled by polymer beads. When the liquid crystal layer is thick, the time taken to inject the liquid crystal can be reduced and variation in the gap between the substrates also can be reduced. To improve the response speed, the thickness is 8 μm or less; desirably, to obtain the response speed of around 30 ms, the liquid crystal layer thickness should preferably be 5 μm or less.

The orientation film is made of polyimide. The orientation film ORI1 on the lower substrate side is rubbed in a rubbing direction RDR1 and the orientation film ORI2 on the upper substrate side is rubbed in a rubbing direction RDR2.

The initial orientation angle is defined to be positive for a counterclockwise rotation with respect to the in-plane direction of the lateral electric field and to range from −90 degrees to 90 degrees. That is, either in the rubbing direction RDR or in the opposite direction thereto, the initial orientation direction is in the range from −90 degrees to 90 degrees with respect to the in-plane direction of the lateral electric field.

Figure 16:
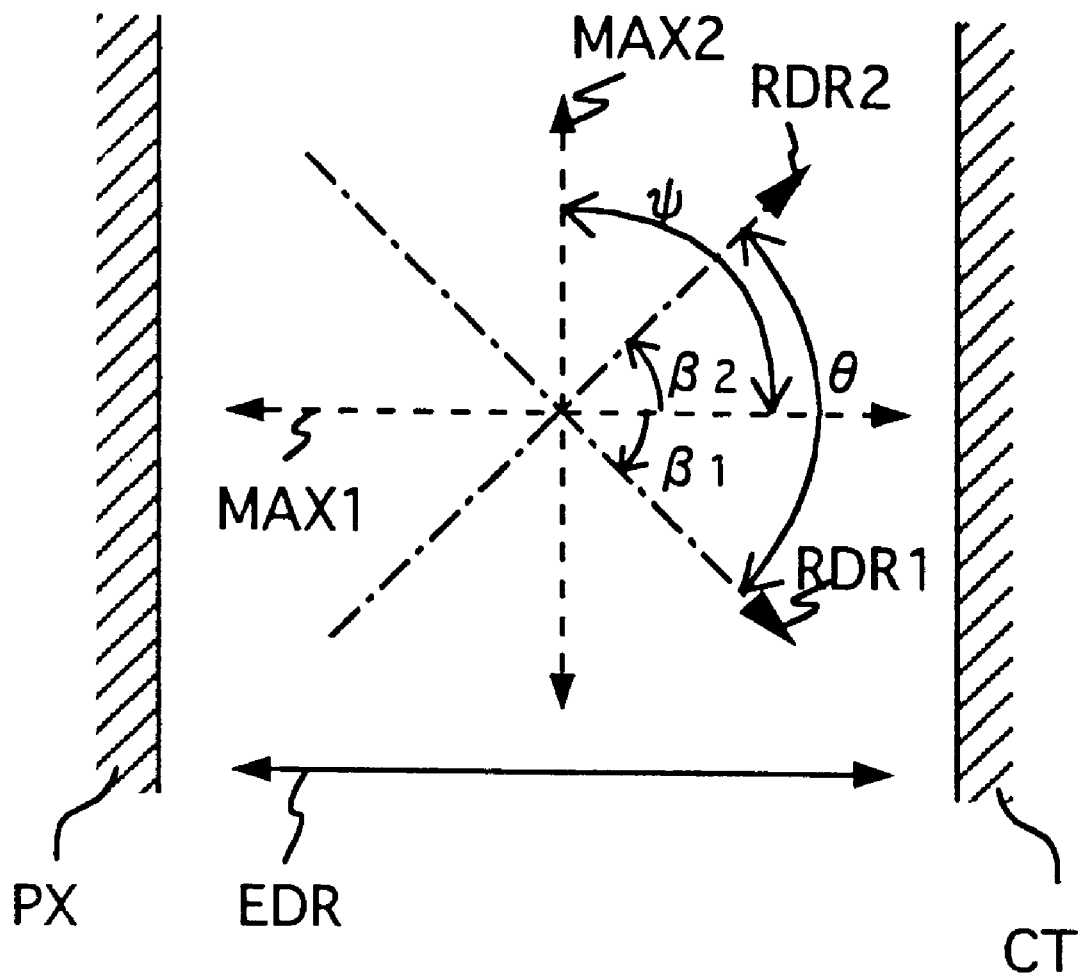
FIG. 16 is a diagram showing the relation between the direction of applied electric field, the rubbing direction, the initial orientation angle, and the polarizing axes of the polarizers.

In this embodiment, the initial orientation angle $\beta 1$ between the rubbing direction RDR1 and the applied electric field direction EDR on the orientation film ORI1 side is set at −45 degrees. The initial orientation angle $\beta 2$ between the rubbing direction RDR2 and the applied electric field direction EDR on the orientation film ORI2 side is set at 45 degrees. The initial orientation angles of the upper and lower substrate sides are twisted $\Theta=90$ degrees. FIG. 16 shows this state. In this embodiment, it is important to set $\beta 1$ and $\beta 2$ so that they may fall in the range from −90 degrees to −35 degrees and in the range from 35 degrees to 90 degrees, or preferably to be set at −45 degrees and 45 degrees, respectively. It is also possible to switch the signs of $\beta 1$ and $\beta 2$. In that case, the twist direction is reversed.

In the rubbing directions RDR1, RDR2 shown in FIG. 16, the orientation of the tilt angle of liquid crystal molecules in the liquid crystal layer at the upper and lower substrate interface is in the "splay" state wherein the liquid crystal molecules produce an effect of compensating for optical characteristics to provide a wide viewing angle characteristic.

The response speed of this invention can also be increased by setting the initial orientation angles $\beta 1$, $\beta 2$ so that the tilt angle of the liquid crystal molecules in the liquid crystal layer is in the "parallel" state. In that case, the rubbing direction RDR1 is, for example, −45 degrees ($\beta 1$ is −45 degrees) with respect to the in-plane direction of the lateral electric field and the rubbing direction RDR2 is −135 degrees ($\beta 2$ is 45 degrees) with respect to the in-plane direction of the lateral electric field. In other words, it is also possible to set the rubbing direction RDR2 in the opposite direction.

A polarizer of Nitto Denko, G1220DU, is used, and the polarizing axis MAX1 of the polarizer POL1 on the lower substrate side is aligned with the direction of the electric field EDR. More particularly, the angle $\phi 1$ between the polarizing axis MAX1 of the polarizer POL1 and the applied electric field direction EDR is set to 0 degree. The polarizing axis MAX2 of the upper polarizer POL2 is set so as to be perpendicular to the polarizing axis MAX1 of the lower polarizer POL1. That is, the angle $\phi 2$ between the polarizing axis MAX2 of the upper polarizer POL2 and the applied electric field direction EDR is set to 90 degrees.

Therefore, the angle between the polarizing axis MAX1 and the polarizing axis MAX2, $\phi=|\phi 2-\phi 1|$, is set to 90 degrees. FIG. 16 shows this relationship. With this arrangement, as the applied voltage between the pixel electrode PX and the counter electrode CT is increased, the optical axes of the liquid crystal molecules are reorientated toward the polarizing axis MAX1, gradually reducing birefringence until the transmittance progressively decreases down to black. In this way a normally open characteristic is produced.

Further, the polarizing axis MAX2 of the upper polarizer POL2 and the polarizing axis MAX1 of the lower polarizer POL1 can be exchanged to produce an identical characteristic. That is, the following setting may be made, $\phi 1=90$ degrees and $\phi 2=0$ degrees.

Figure 5:
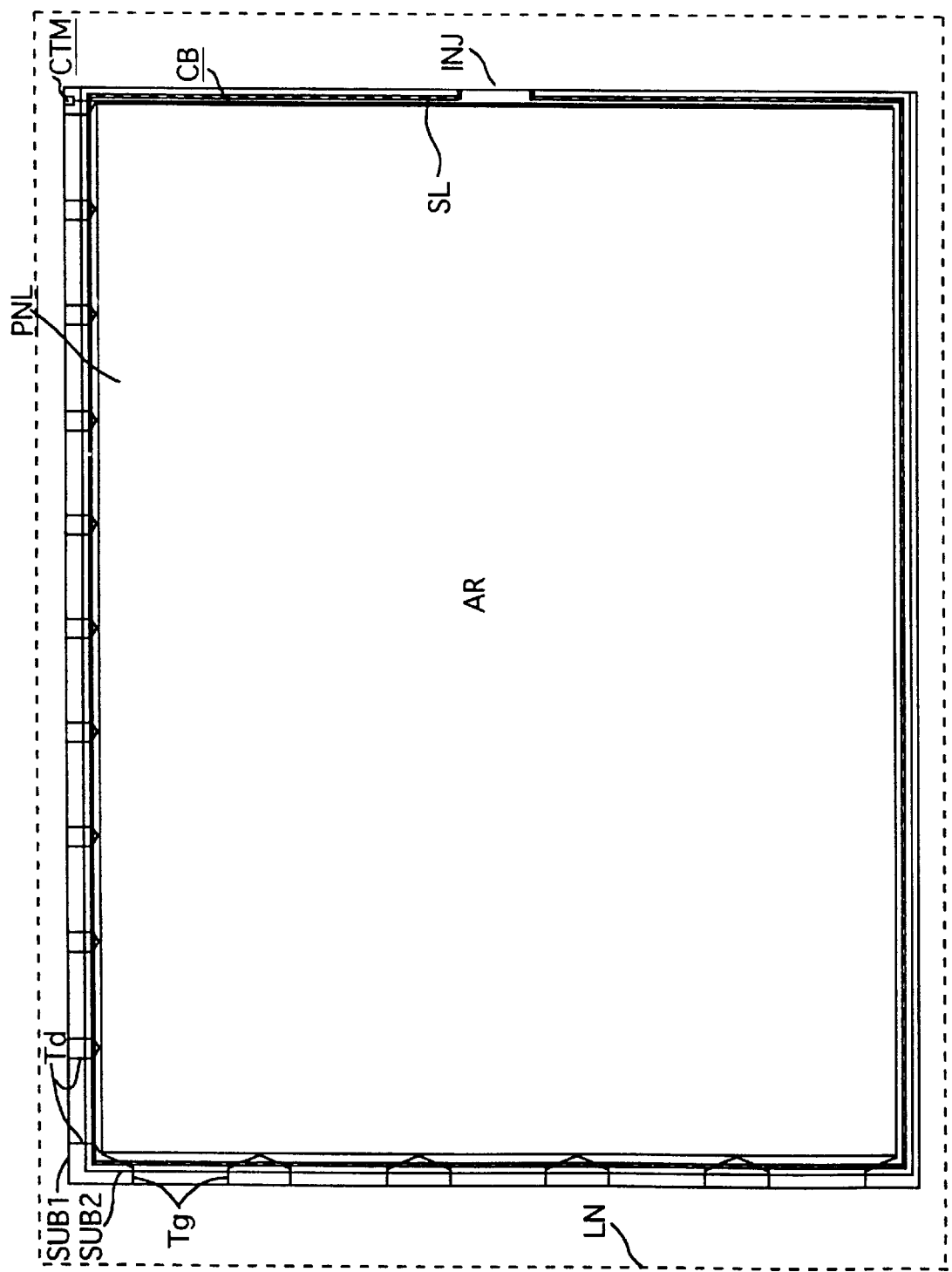
FIG. 5 is a plan view showing the configuration of a peripheral portion around the matrix in the display panel.

FIG. 5 is a plan view showing a peripheral portion around the matrix (AR) of the display panel PNL including the upper and lower glass substrates SUB1, SUB2. FIG. 6(a) shows a cross section of an external connection terminal GTM region to which the scanning circuit is to be connected, and FIG. 6(b) shows a cross section of a seal portion with no external connection terminals.

In the manufacture of this panel, if the panel size is small, a plurality of devices are fabricated simultaneously from a single glass substrate and then divided into individual panels for improved throughput. If the panel size is large, a standard size glass substrate is commonly used to fabricate any type or kind of device in order to share the manufacturing facility and then the substrate is cut to an appropriate size for each kind of device. In either case, after being subjected to a predetermined sequence of processes, the glass substrate is cut. FIG. 5 and FIGS. 6(a) and 6(b) represent the latter case. These figures show the state of the upper and lower substrates SUB1, SUB2 after being cut, LN denoting the edge of the substrates before cutting. In either case, where there are external connection terminal groups Tg, Td and terminals COT (subscript omitted) (upper and left sides in the figure), the size of the upper substrate SUB2 in a finished state is limited to the inside of the lower substrate SUB1 to expose these terminals.

The terminal groups Tg, Td including the scanning circuit connection terminals GTM, the signal electrode circuit connection terminals DTM, and their lead out wiring portion are designated in groups of terminals grouped for each tape carrier package TCP (FIGS. 13, 14) mounted with an integrated circuit chip CHI. The readout wiring from the matrix portion of each terminal group to the external connection terminal portion are inclined as they approach the ends. This is to match the terminals DTM, GTM of the display panel PNL to the arrangement pitch of the packages TCP and the connection terminal pitch in each package TCP. The counter electrode terminal COT is a terminal which is used to apply a counter voltage from the external circuit to the counter electrode CT. The counter voltage lines CL of the matrix portion are led out to the opposite side of the scanning circuit terminals GTM (to the right side in the figure) and are grouped together with a common bus line CB and connected to the counter electrode terminal COT.

Between the transparent glass substrates SUB1, SUB2 a seal pattern SL is formed along their edges except for a liquid crystal injection port INJ, so that the liquid crystal LC can be sealed. The sealing material may be made of epoxy resin.

The orientation films ORI1, ORI2 are formed inside the seal pattern SL. The polarizers POL1, POL2 are formed on the outer surfaces of the lower transparent glass substrate SUB1 and the upper transparent glass substrate SUB2, respectively. The liquid crystal LC is sealed in a space enclosed by the lower orientation film ORI1 and upper orientation film ORI2, both setting the orientation of the liquid crystal molecules, and by the seal pattern SL. The lower orientation film ORI1 is formed over the passivation layer PSV1 on the lower transparent glass substrate SUB1 side.

This liquid crystal display device is assembled by stacking a variety of layers on the lower transparent glass substrate SUB1 and on the upper transparent glass substrate SUB2, separately; forming the seal pattern SL on the upper transparent glass substrate SUB2 side; stacking the lower transparent glass substrate SUB1 and the upper transparent glass substrate SUB2; injecting the liquid crystal LC from the injection port INJ of the seal material SL; sealing the injection port INJ with epoxy resin or the like; and cutting the upper and lower substrates.

FIGS. 7(A) and 7(B) show the structure of the connection from the scanning signal line GL of the display matrix to its external connection terminal GTM. FIG. 7(A) is a plan view and FIG. 7(B) is a cross section taken along the line B—B of FIG. 7(A). The figures correspond to the lower part of the connection structure and the inclined wiring is shown by straight lines for convenience.

AO denotes a boundary line of a photoresist direct drawing, i.e., a photoresist pattern for selective anodic oxidation. This photoresist is removed after anodic oxidation and thus the pattern AO shown in FIG. 7(A) does not remain in the completed product. But because the oxide film AOF is selectively formed over the gate line GL as shown in cross section in FIG. 7(B), its trace remains. In the plan view of FIG. 7(A), the left side of the photoresist boundary line AO is an area that is covered with resist and is not subjected to anodic oxidation, while the right side is exposed from the resist for anodic oxidation. On the anodically oxidized aluminum layer g1 is formed an oxide, $Al_2O_3$ film AOF, reducing the volume of the underlying conductive portion. The anodic oxidation, of course, is performed under properly controlled conditions including time and voltage control so that the underlying conductive portion may remain.

In FIG. 7(A), the aluminum layer g1 is shown by a hatched portion for easy recognition, and the region that is not subjected to anodic oxidation is patterned in the form of comb teeth, for the following reason. When the width of the aluminum layer is wide, whiskers are formed on the surface. Hence, the aluminum layer is divided into a plurality of parallel narrow lines to prevent the formation of whiskers while at the same time minimizing the probability of line breakage and the reduction of conductivity.

The gate terminal GTM comprises the aluminum layer g1 and a transparent conductive layer g2 that protects the surface of g1 and improves the reliability of connection with tape carrier packages. The transparent conductive layer g2 is a transparent conductive indium-tin-oxide film (ITO: NESA film) formed by sputtering to a thickness of 100–2000 Å (in this embodiment, about 1400 Å). Conductive layers d1, d2 are formed over the aluminum layer g1 and its side. The conductive layer d1 is a Cr layer that has good connectability with both the aluminum layer and the transparent conductive layer g2 to reduce connection resistance and thereby to compensate for a defective connection between the aluminum layer and the transparent conductive layer g2. The conductive layer d2 remains there because it is formed by the same mask used for the conductive layer d1.

In the plan view, the gate insulating film GI is formed on the right side of its boundary line and the passivation layer PSV1 is also formed on the right side of its boundary line. Hence, the terminal portion GTM located at the left end is exposed for electrical contact with external circuits. Although the figure shows only one pair of a gate line g1 and a gate terminal, the actual device has a plurality of such pairs arranged parallelly in a vertical direction to form terminal groups Tg (FIG. 5). The left end of the gate terminal is extended beyond the cutting area of the substrate and is short-circuited by a wiring Shg (not shown) during the process of manufacture. Such a shorting line SHg is used for supplying electricity during the anodic oxidation and for preventing electrostatic breakdown during the rubbing of the orientation film ORI1 in the process of manufacture.

FIGS. 8(A) and 8(B) show the structure of the connection from the video signal line DL to its external connection terminal DTM. FIG. 8(A) is a plan view and FIG. 8(B) is a cross section taken along the line B—B of FIG. 8(A). FIG. 8(A) corresponds to the upper right area of FIG. 5, although the direction of the figure is changed for convenience of description. The right-hand end area of FIG. 8(A) corresponds to the upper end portion of the substrate SUB1.

TSTd designates a testing pad, which is formed to be wider than its line portion so that a probe or the like can be brought into contact with it, although it is not connected with external circuits. Similarly, the drain terminal DTM, too, is formed to be wider than its line portion for connection with external circuits. The external connection drain terminals DTM are arranged in the vertical direction, forming the terminal groups Td (subscript omitted) as shown in FIG. 5 and extending beyond the cutting line of the substrate SUB1. The drain terminals DTM are all short-circuited by the wiring SHd (not shown) to prevent electrostatic breakdown during the manufacturing process. The testing pad TSTd is formed at every other video signal line DL as shown in FIG. 8(A).

The drain connection terminal DTM is formed of a single transparent conductive layer g2 and is connected to the video signal lines DL at portions where the gate insulating film GI is removed. The semiconductor layer AS formed over the end of the gate insulating film GI so as to etch the edge of the gate insulating film GI in a tapered shape. The passivation layer PSV1 is of course removed from the terminal DTM for connection with the external circuits.

The readout wire from the matrix portion to the drain terminal portion DTM has its layers d1, d2 which are at the same level of the video signal lines DL extending to an intermediate portion of the passivation layer PSV1 and connected with the transparent conductive layer g2 inside the passivation layer PSV1. This arrangement is intended to protect the aluminum layer d2, which is vulnerable to galvanic corrosion, with the passivation layer PSV1 and the seal pattern SL.

Figure 9A:
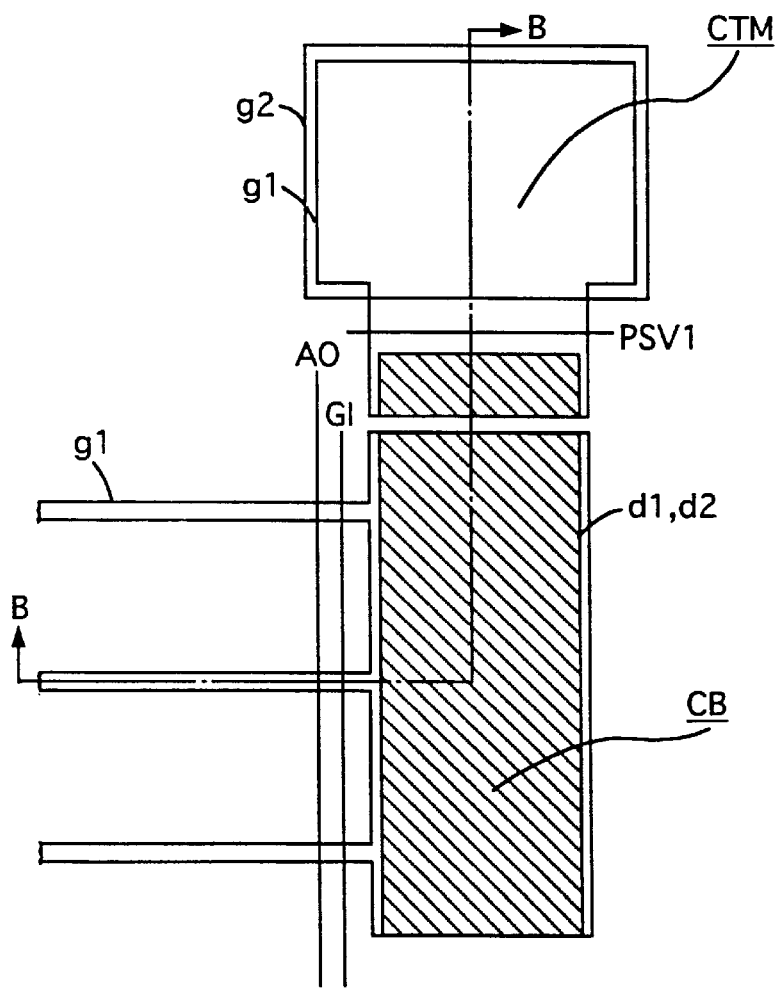
FIG. 9(A) is a plan view and FIG. 9(B) is a cross-sectional view showing the connecting portion of the common electrode terminal CTM, the common bus line CB and the common voltage line CL.
Figure 9B:
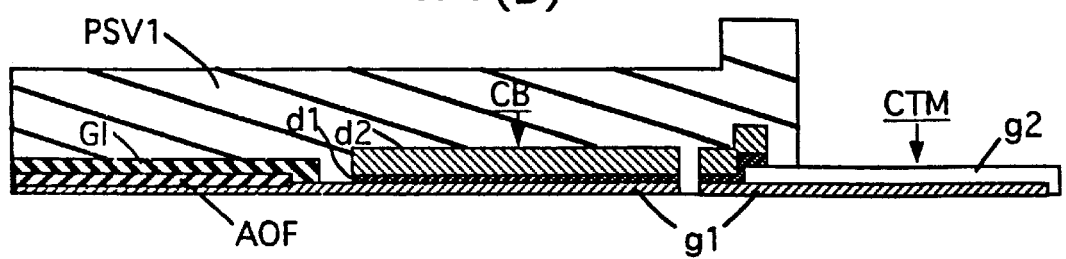

FIGS. 9(A) and 9(B) show the structure of the connection from the counter voltage line CL to its external connection terminal CTM. FIG. 9(A) is a plan view and FIG. 9(B) is a cross section taken along the line B—B of FIG. 9(A). The figures correspond to the upper left area of FIG. 5.

The counter voltage lines CL are grouped with the common bus line CB and are led out to the counter electrode terminal CTM. The common bus line CB comprises a conductive layer g1, and other conductive layers d1, d2 stacked on the first layer g1. This arrangement is designed to reduce the resistance of the common bus line CB and thereby to supply a sufficient counter voltage from the external circuit to each counter voltage line CL. This structure is characterized by the ability to reduce the resistance of the common bus line without imposing any additional burden on the conductive layer. The conductive layer g1 of the common bus line CB is not subjected to anodic conversion, in order that it is electrically connected to the conductive layers d1, d2. It is also exposed from the gate insulating film GI.

The counter electrode terminal CTM has the transparent conductive layer g2 stacked over the conductive layer g1. The conductive layer g1 is covered with the transparent conductive layer g2, which has good corrosion resistance, to protect the surface of the conductive layer g1 against galvanic corrosion.

Figure 10:
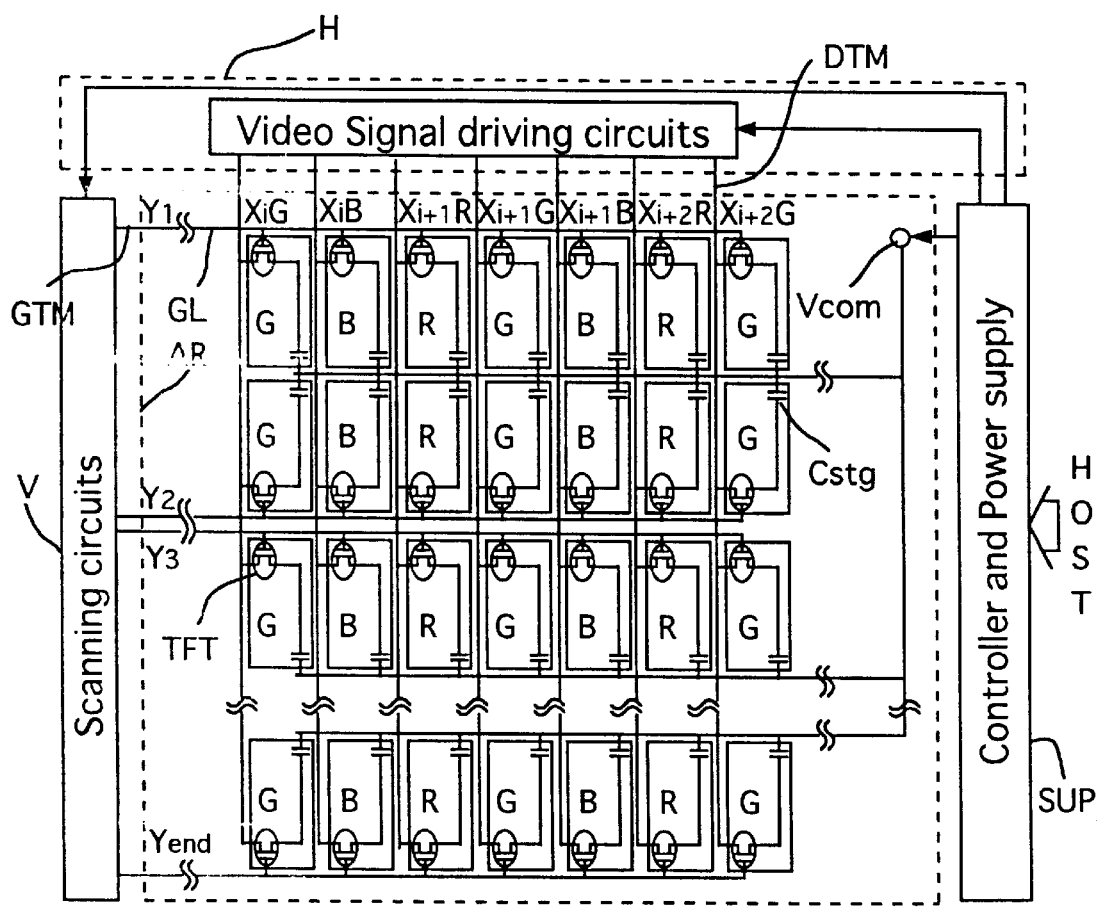
FIG. 10 is a schematic circuit diagram showing the matrix area and its peripheral portion in the active matrix type color liquid crystal display device of this invention.

An equivalent circuit of the display matrix portion and its peripheral circuit are shown in FIG. 10. The figure, though it is a circuit diagram, is drawn in compliance with actual geometric arrangement. AR represents a matrix array in which a plurality of pixels are arranged in two dimensional array.

In the figure, X represents the video signal lines DL, with subscripts G, B and R representing green, blue and red pixels. Y designates scanning signal lines GL, with subscripts 1, 2, 3, . . . , end indicating the order of scan timing. The scanning signal lines Y (the subscripts are omitted) are connected to a scanning circuit V and the video signal lines X (the subscripts are omitted) are connected to a video signal driving circuit H. A circuit SUP includes a power supply circuit for producing step-down power supply voltages from one power source and a circuit for converting information for a CRT from a host computer (higher order computer) into information for a TFT liquid crystal display.

Figure 11:
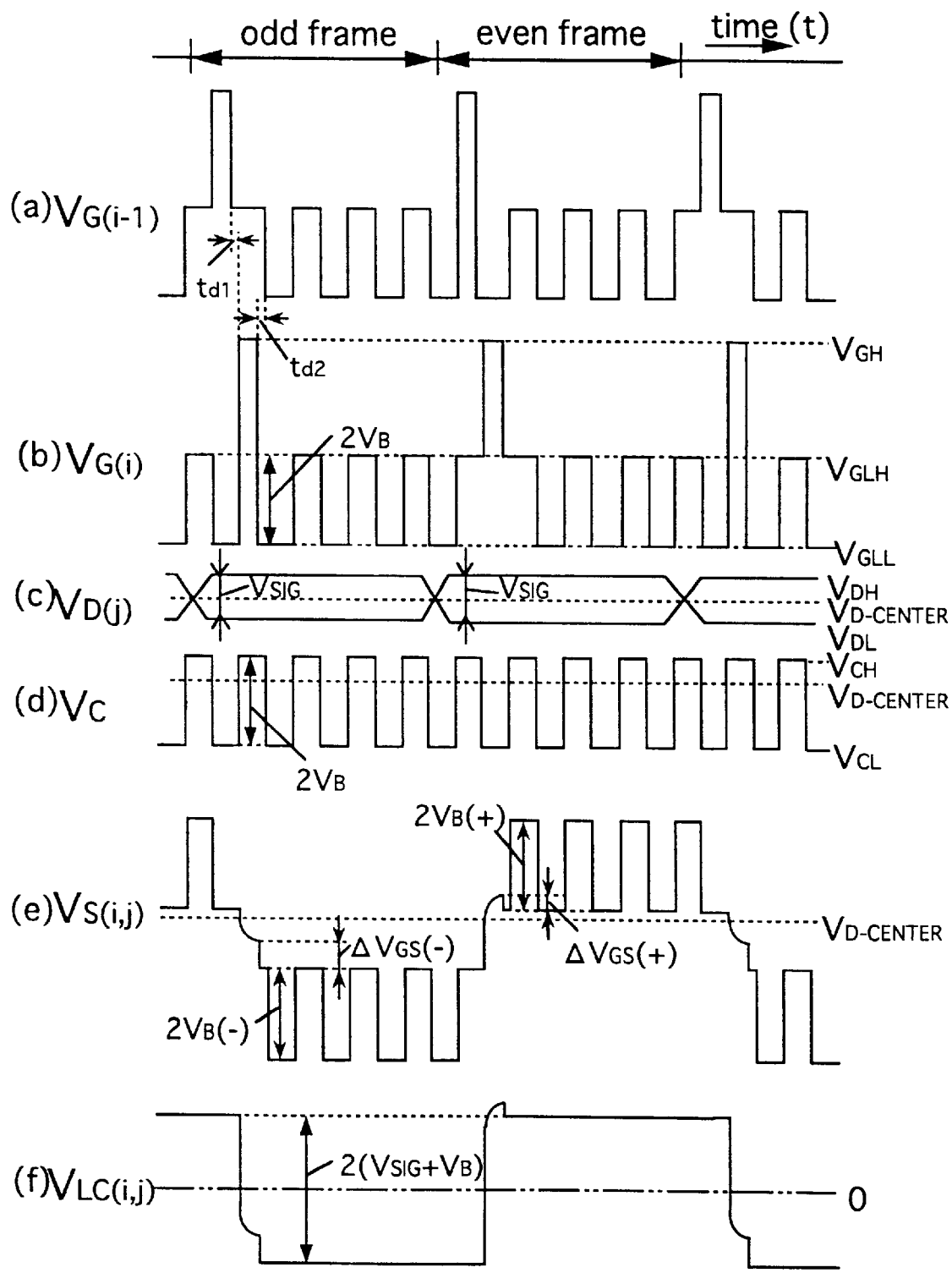
FIG. 11 is a waveform diagram showing drive signals of the active matrix type color liquid crystal display device of this invention.

FIG. 11 shows drive signal waveforms for the liquid crystal display device of this invention. The counter voltage is transformed into alternating rectangular waves having binary values, Vch and Vcl, and, in synchronism with the alternating waves, a nonselection voltage for the scanning signals Vg (i−1), Vg(i) is changed between two values, Vhlh and Vgll, in each scanning period. The amplitude of the counter voltage and the amplitude of the nonselection voltage are set to be equal. The video signal voltage is obtained by subtracting half the counter voltage from the voltage to be applied to the liquid crystal layer.

The counter voltage may be a DC voltage, but transforming it into the AC voltage makes it possible to reduce the maximum amplitude of the video signal voltage, allowing the use of a video signal driving circuit (signal side driver) with a lower dielectric strength.

The storage capacitor Cstg is provided for holding the video information written in a pixel for a long period (after the thin-film transistor TFT is turned off). In the system of this invention where an electric field is applied in a direction parallel to the substrate surface, unlike the system where the electric field is applied perpendicularly to the substrate surface, because there is almost no capacitance (generally called a liquid capacitance) produced by the pixel electrode and the counter electrode, the storage capacitor Cstg cannot hold the video information in the pixel. Thus, in the system where the electric field is applied parallel to the substrate surface, the storage capacitor Cstg is an essential constitutional element.

The storage capacitor Cstg, when the thin-film transistor TFT is switched, also works to reduce the effect of the gate potential change $\Delta Vg$ on the pixel electrode potential Vs. This is expressed by the following equation:

$$\Delta vs = \{Cgs/(Cgs+Cstg+Cpix)\} \times \Delta vg.$$

Here, Cgs is a parasitic capacitance produced between the gate electrode GT and the source electrode SD1 of the thin-film transistor TFT, Cpix is a capacitance produced between the pixel electrode PX and the counter electrode CT, and $\Delta Vs$ is a voltage generally called a feed-through voltage, a change in the pixel electrode potential caused by $\Delta Vg$. This change $\Delta Vs$ is the cause of a DC component applied to the liquid crystal LC and can be reduced by increasing the capacitance of the storage capacitor Cstg. Reduced DC components applied to the liquid crystal LC will improve the service life of the liquid crystal LC, mitigating so-called image persistence, a phenomenon in which a previous image remains when the liquid crystal screen is switched to another image.

As described above, since the gate electrode GT is so large as to cover the entire i-type semiconductor layer AS, the overlapping area with the source electrode SD1 and the drain electrode SD2 correspondingly increase, which in turn increases the parasitic capacitance Cgs, making the pixel electrode potential Vs more susceptible to the influence of the gate (scanning) signal Vg. The provision of the storage capacitor Cstg, however, can eliminate this disadvantage. The method of driving is not limited to that described and other active matrix driving methods may be employed. These methods all fall within the scope of this invention.

Figure 12:
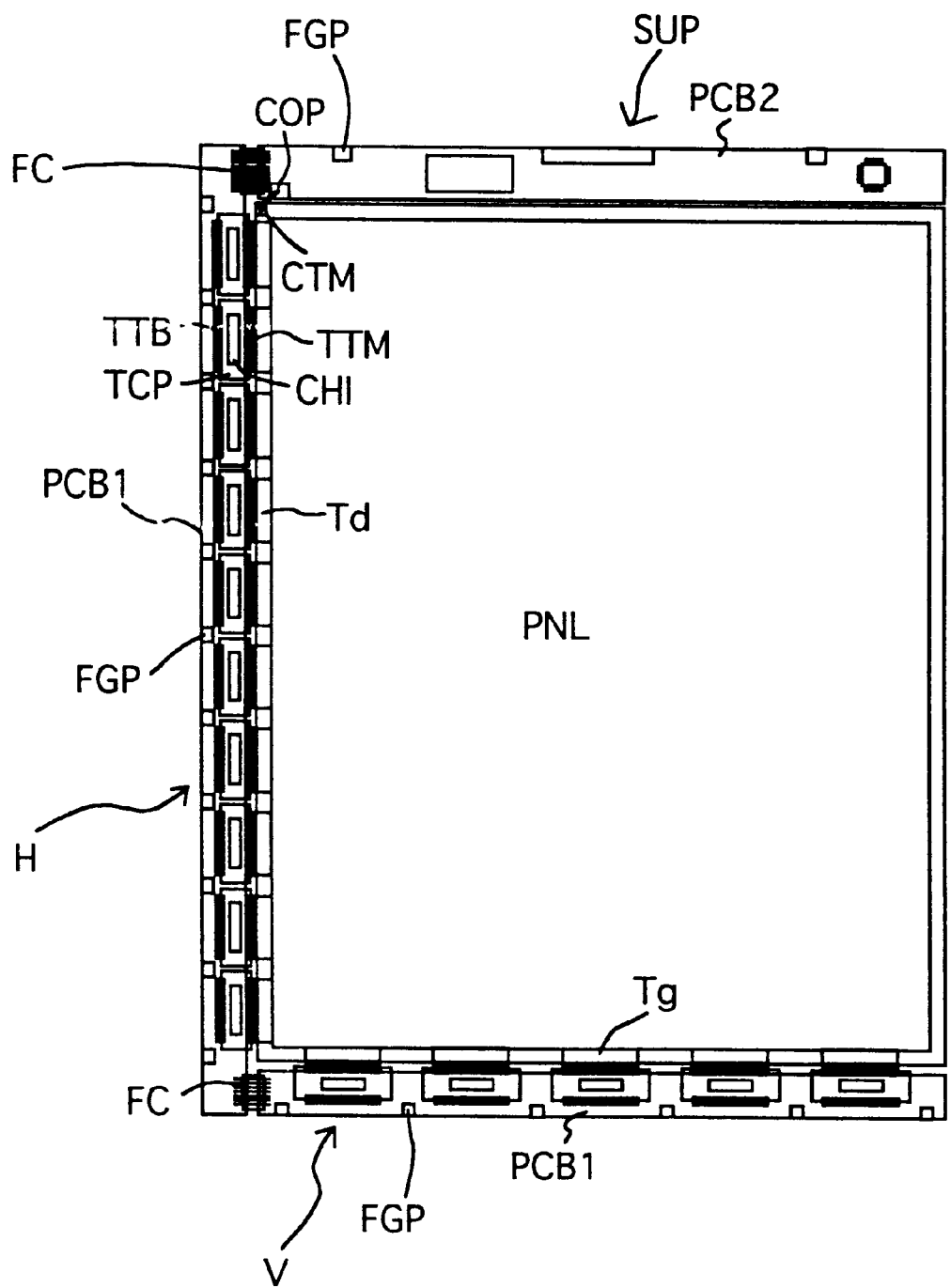
FIG. 12 is a top plan view showing the liquid crystal display panel equipped with the peripheral drive circuits.

FIG. 12 is a plan view showing the display panel PNL of FIG. 5 connected with the video signal driving circuit H and the scanning circuit V. CHI represents drive IC chips to drive the display panel PNL (five shown at the bottom are drive IC chips on the scanning circuit side; ten shown to the left are drive chips on the video signal driving circuit side). TCP denotes tape carrier packages mounted with the drive IC chips CHI by the tape automated bonding (TAB), as will be described later with reference to FIGS. 13 and 14. A printed circuit board PCB1 is mounted with the TCPs and capacitors and is divided in two parts, one for the video signal driving circuit and the other for the scan signal driving circuit. FGP denotes a frame ground pad to which are soldered spring-like pieces formed by cutting a shield case SHD. A flat cable FC electrically connects the lower-side printed circuit board PCB1 and the left printed circuit board PCB1. The flat cable FC may, as shown, be formed by sandwiching a plurality of lead wires (of phosphor bronze plated with Sn) between a striped polyethylene layer and a polyvinyl alcohol layer.

Figure 13:
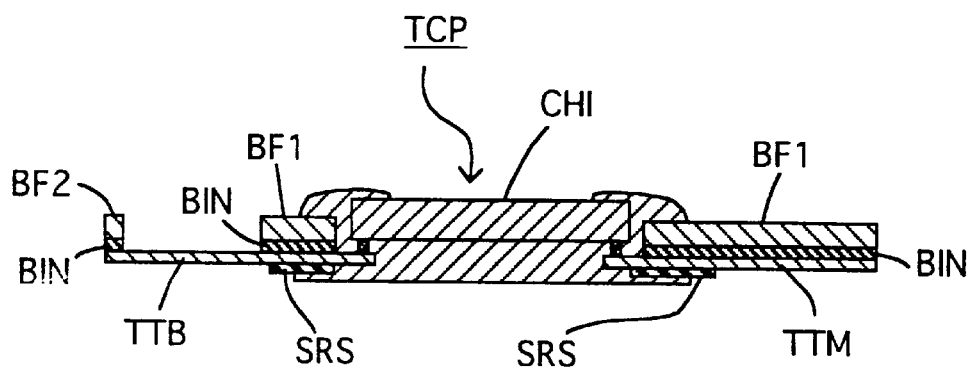
FIG. 13 is a cross-sectional view of the tape carrier package TCP having the flexible printed circuit board mounted with the IC chips CHI forming the drive circuit.
Figure 14:
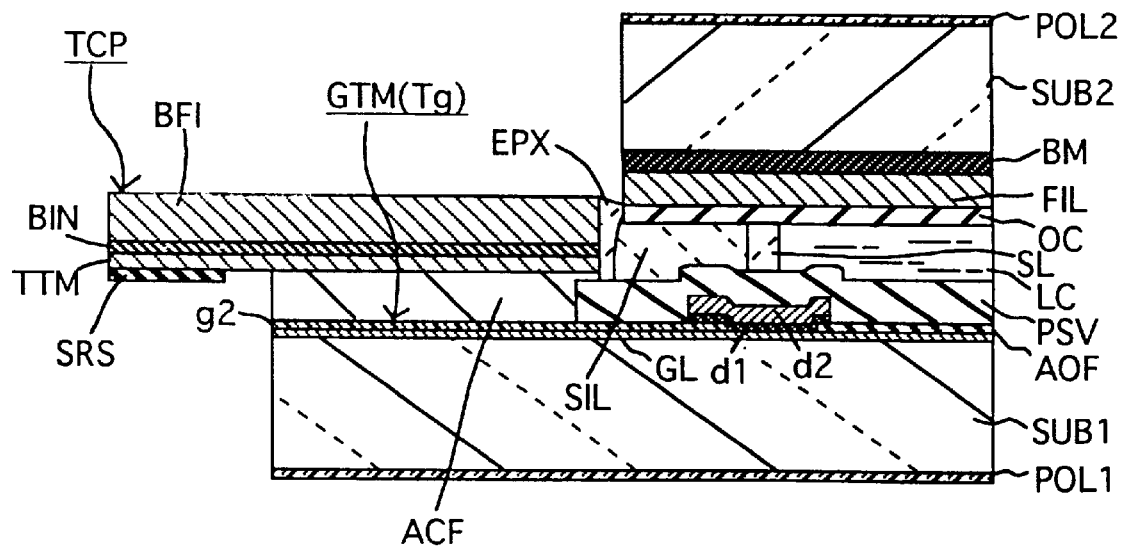
FIG. 14 is a cross section showing the tape carrier package TCP connected to the scan signal terminal GTM of the liquid crystal display panel PNL.

FIG. 13 shows a cross-sectional structure of the tape carrier package TCP where the IC chips CHI comprising the scan signal driving circuit V and the video signal driving circuit H is mounted on the flexible printed circuit boards. FIG. 14 is a cross section showing an essential part of the liquid crystal display panel connected to the scan signal terminal GTM.

In FIG. 13, TTB denotes an input terminal/wiring portion of the IC circuit CHI. TTM represents an output terminal/wiring portion of the IC circuit CHI. These are made, for instance, of Cu and their inner ends (generally called inner leads) are connected with bonding pads PAD of the IC circuit CHI by facedown bonding. The outer ends (generally called outer leads) of the terminals TTB, TTM correspond to the input and output, respectively, of the semiconductor IC circuit chip CHI and are connected to the CRT/TFT conversion circuit/power supply circuit SUP by soldering and to the liquid crystal display panel PNL through the anisotropic conductive film ACF, as seen in FIG. 14. The package TCP is connected to the panel so that the package end covers the edge of the passivation layer PSV1 that exposes the connection terminal GTM on the panel PNL side. Hence, the outer connection terminal GTM (DTM) is covered with at least one of the passivation layer PSV1 and the package TCP, so that its resistance against galvanic corrosion is enhanced.

BF1 denotes a base film made, for example, of polyimide. SRS denotes a solder resist serving film as a mask to prevent solder from flowing to unwanted areas during the soldering process. The gap between the upper and lower glass substrates on the outer side of the seal pattern SL is, after cleaning, protected with epoxy resin EPX or the like. Furthermore, silicone resin SIL is placed between the package TCP and the upper substrate SUB2 for double protection.

The printed circuit board PCB2 is mounted with electronic parts, such as ICs, capacitors and resistors. The printed circuit board PCB2 is mounted with a circuit SUP that includes a power supply circuit for producing step-down supply voltages from a single power source and a circuit for converting CRT information from a host computer (higher order computer) into TFT liquid crystal display device information. CJ represents a connector portion for a connector (not shown) that is connected with an external circuit. The printed circuit board PCB1 and the printed circuit board PCB2 are electrically connected with a flat cable FC.

Figure 15:
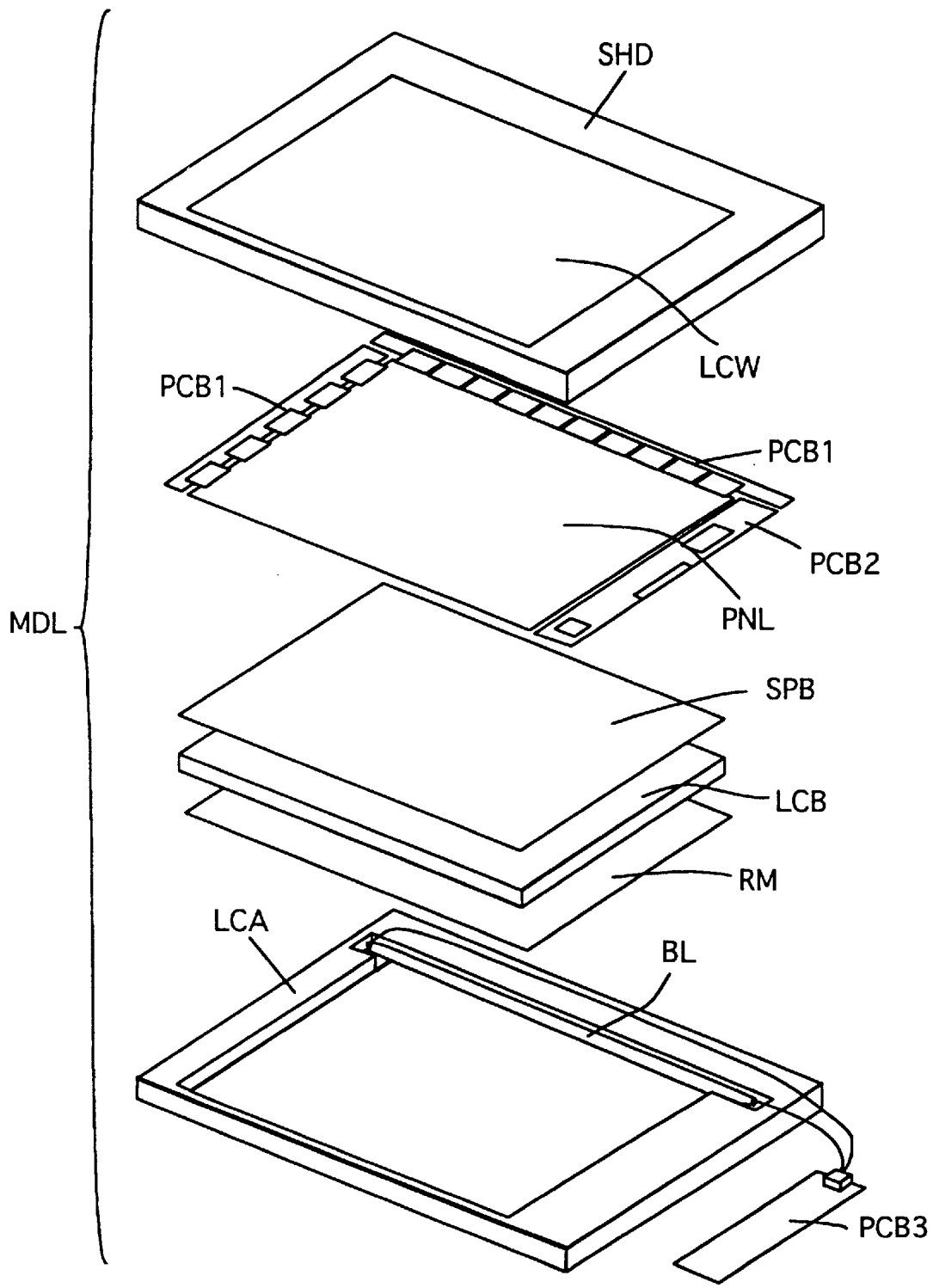
FIG. 15 is an exploded perspective view of the liquid crystal display module.

FIG. 15 is an exploded perspective view of constitutional parts of a liquid crystal display module MDL. SHD represents a frame-like shield case (metal frame) made of a metal plate; LCW denotes a window for the liquid crystal display; PNL denotes a liquid crystal display panel; SPB a diffuser; LCB a light conductor; RM denotes a reflector; BL denotes a backlight fluorescent tube; and LCA denotes a backlight case. These elements are stacked together in a vertical relationship as shown in the figure to form a module MDL. The module MDL is secured together with claws and hooks provided on the shield case SHD.

The backlight case LCA is so shaped as to accommodate the backlight fluorescent tube BL, diffuser SPB, light conductor LCB and reflector RM. The light from the backlight fluorescent tube BL arranged at the side of the light conductor LCB is diffused by the light conductor LCB, reflector RM and diffuser SPB to produce uniform light at the display surface and is directed to the liquid crystal display panel PNL. The backlight fluorescent tube BL is connected with an inverter circuit board PCB3 which is a power source of the backlight.

Embodiment 1

FIG. 16, FIGS. 17(a) and 17(b) and FIGS. 18(a) and 18(b) show the principle of driving the liquid crystal of Embodiment 1. The operating principle of this embodiment will be explained for a case where the dielectric anisotropy Ac of the liquid crystal is positive.

Figure 17:
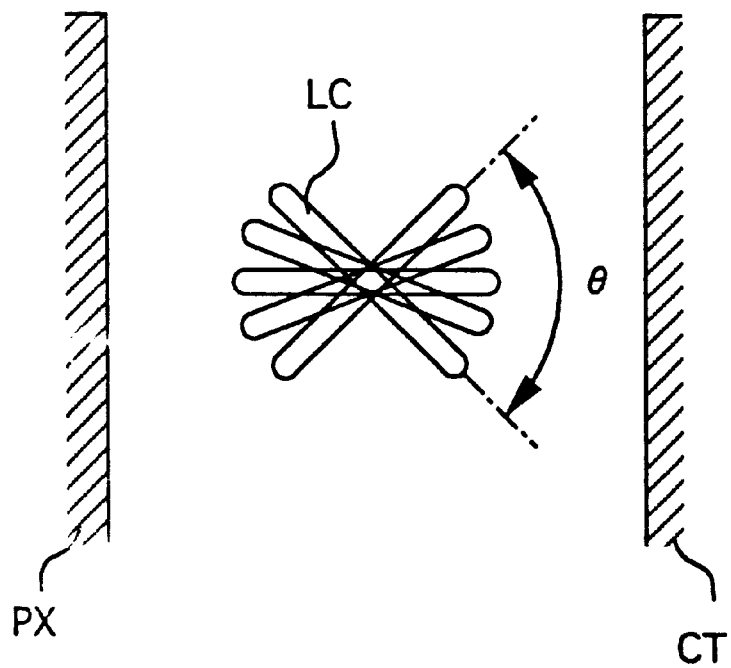
FIG. 17(a) and FIG. 17(b) are diagrams showing the action of the liquid crystal of Embodiment 1 as seen from a direction perpendicular to the substrate surface.
Figure 17B:
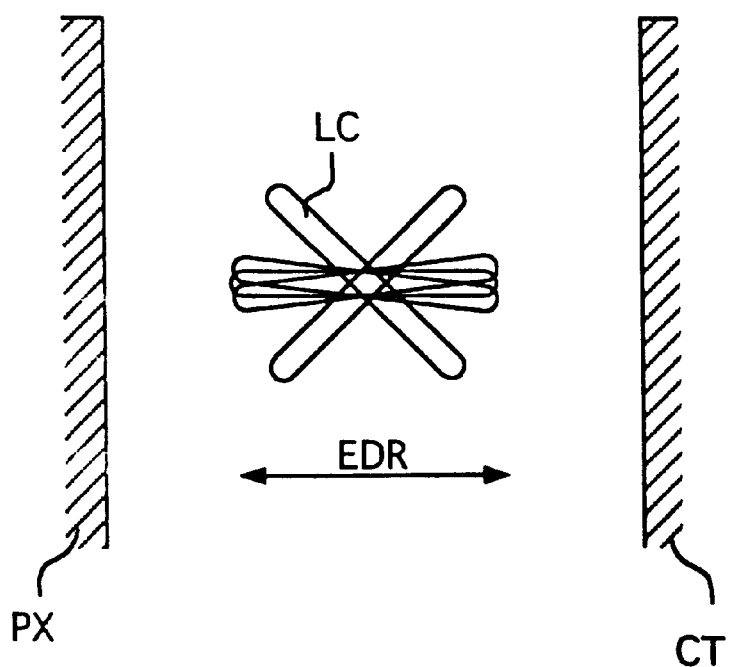
Figure 18:
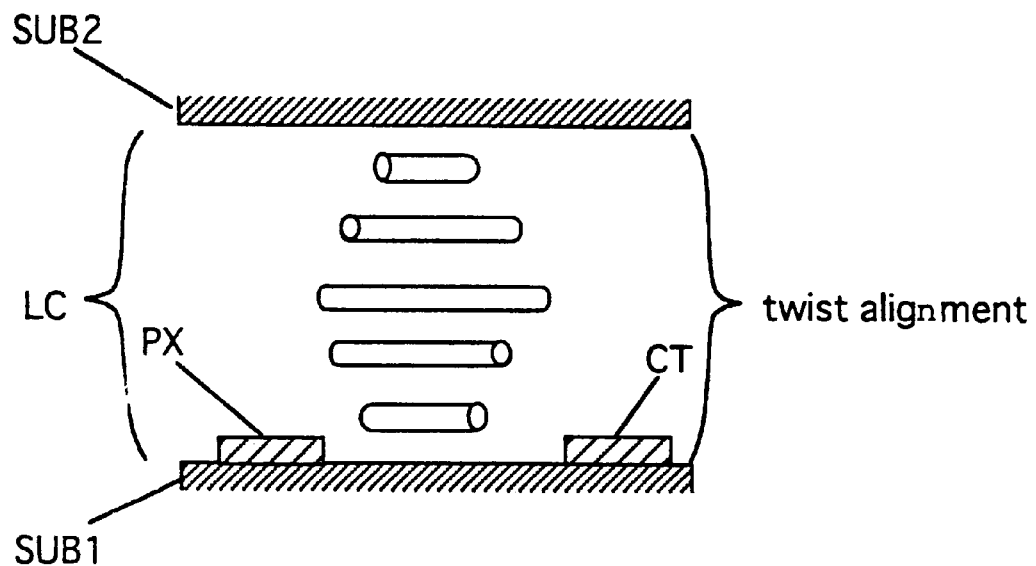
FIG. 18(a) and FIG. 18(b) are diagrams showing the action of the liquid crystal of Embodiment 1 as seen from a cross-sectional direction.
Figure 18B:
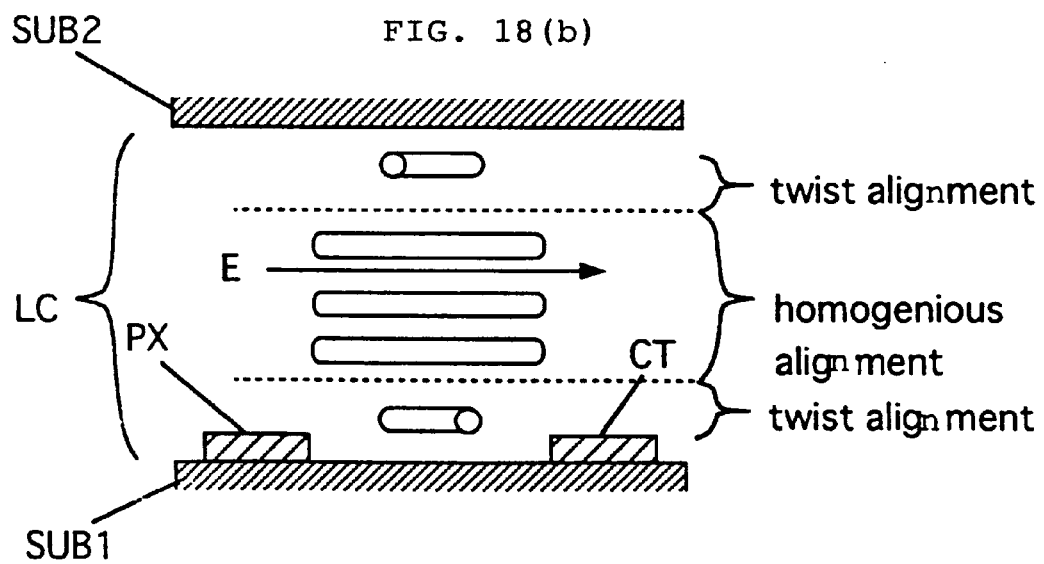

When no voltage is applied, the liquid crystal molecules in the liquid crystal layer are in the initial state where they are twisted 90 degrees clockwise from the upper substrate SUB2 to the lower substrate SUB1, as shown in FIG. 17(a). When the voltage is applied, the part of the twisted liquid crystal molecules in the direction of thickness of the liquid crystal layer decreases as shown in FIG. 17(b), such that only molecules in the region close to the interfaces with the upper and lower substrates remain twisted while a major part of the liquid crystal molecules become oriented homogeneously in the voltage application direction.

When the voltage is not applied in the configuration of the liquid crystal layer and the arrangement of the polarizing axis of the polarizer of FIG. 16, a high transmittance state (white display) can be obtained by the birefringence effect of the liquid crystal. Further, during voltage application, because the homogeneously oriented liquid crystal molecules are aligned with the polarizing axis of one polarizer, the birefringence does not occur at that portion, causing the virtual retardation of the liquid crystal layer to come close to zero, and producing no birefringence effect.

When the voltage is applied, however, the liquid crystal layers near the interfaces actually remain twisted, so that retardation does not become zero. In this embodiment, the thickness of the liquid crystal layer of the twisted molecules can be reduced infinitely, making it possible to assume that almost all molecules can be homogeneously oriented. Because the polarizers are cross-Nicols-arranged (perpendicularly to each other), light cannot pass through, producing a black display if there is no birefringence.

Based on this operating principle, the following display characteristics are obtained. With the configuration of Embodiment 1, a normally open type electro-optical characteristic is obtained that produces a white display when no voltage is applied. The transmittance at the time of the white display was 4.5%. Further, the contrast ratio of 3 was obtained at the time of a black display by applying a drive voltage of 12 V.

Figure 19:
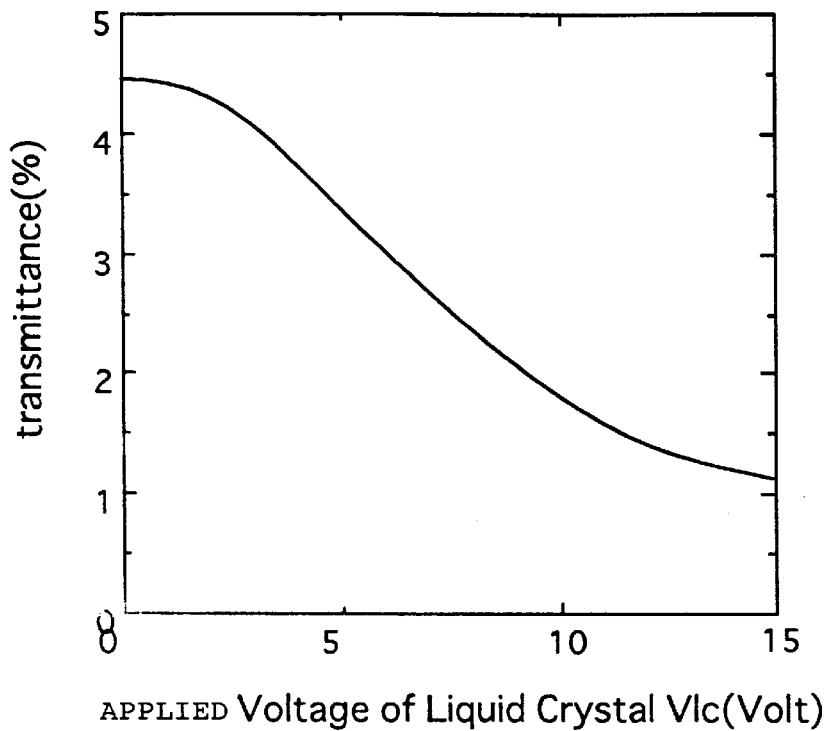
FIG. 19 is a graph showing the relation between the liquid crystal applied voltage and the transmittance in Embodiment 1.

FIG. 19 shows an applied voltage-transmittance characteristic of Embodiment 1. As seen in the figure, increasing the drive voltage causes the transmittance to decrease, thus improving the contrast ratio. Because of the limitation on the withstand voltage of the drive circuit, however, in this embodiment, the maximum drive voltage is 12 V. It should be noted that the present invention also includes cases where higher or lower maximum drive voltages are used for the driving. The response speed of the liquid crystal display device of Embodiment 1 was 22 ms, of which 8 ms was a rise time and 14 ms a fall time.

Figure 20:
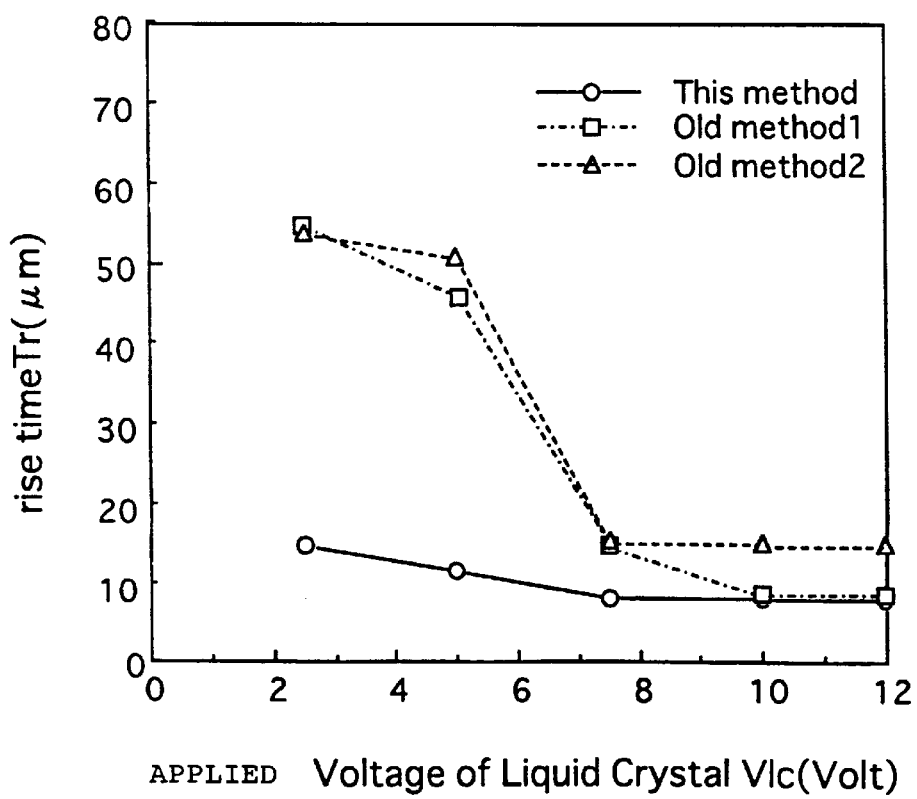
FIG. 20 is a graph showing the relation between the liquid crystal applied voltage and the rise time in Embodiment 1.
Figure 21:
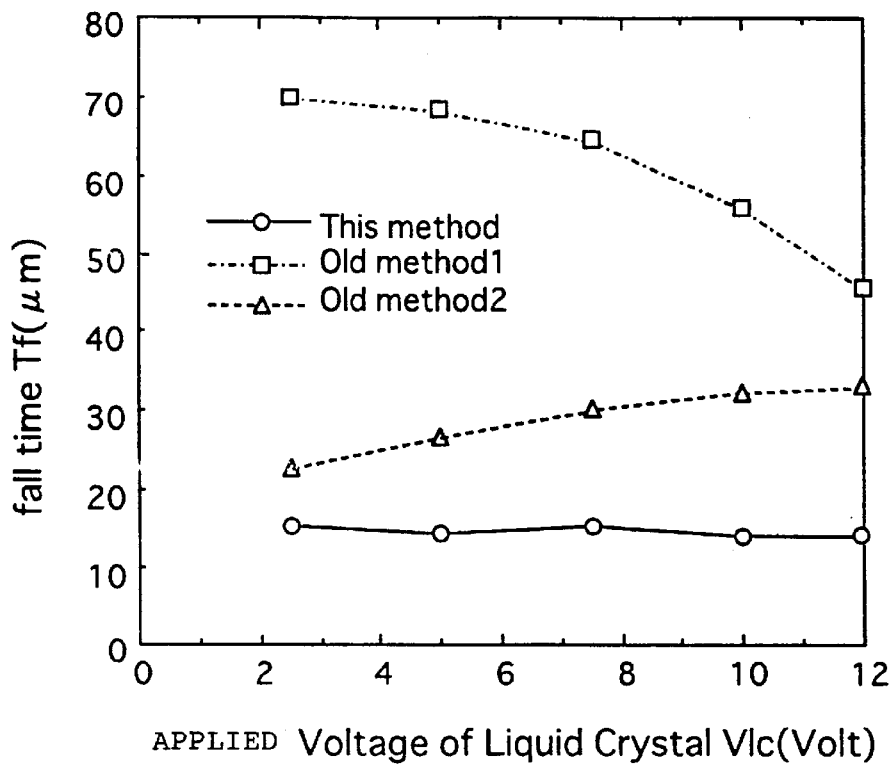
FIG. 21 is a graph showing the relation between the liquid crystal applied voltage and the fall time in Embodiment 1.
Figure 22:
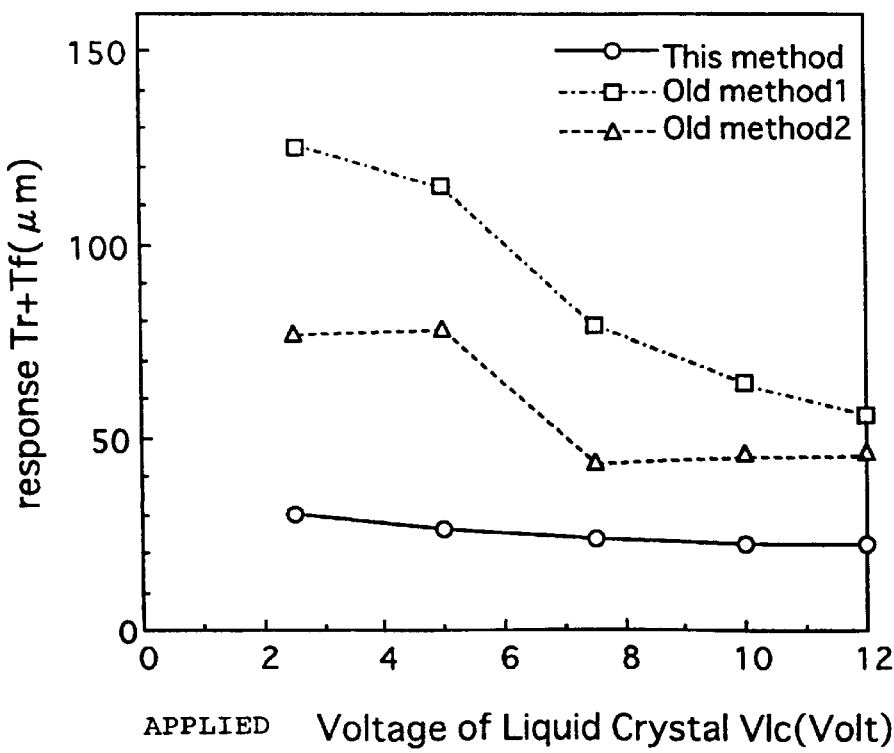
FIG. 22 is a graph showing the relation between the liquid crystal applied voltage and the overall response time in Embodiment 1.

FIGS. 20 to 22 show the rise time Tr, the fall time and the response speed. The response speed of Embodiment 1 is shorter than 30 ms, enabling display of a dynamic image, and this means that a dynamic image can be displayed in a good condition without any trailing. FIGS. 20 to 22 show, for comparison, the response speed of the first case (conventional configuration 1) and the second case (conventional configuration 2) described above. The response speed of this invention is about ½ to ¼ that of the conventional configurations, realizing a significant improvement. The conventional configuration 2 had a liquid crystal layer thickness of 4.0 μm when its response speed was measured. Although the conventional configuration 2 has a normally closed (normally black) characteristic that enables white display when supplied with a voltage, the liquid crystal layer thickness was 4.0 μm in order to make the transmittance of the same liquid crystal material for a white display equal to that of the conventional configuration 1 and the Embodiment 1. The conventional configuration 1 and Embodiment 1 were set at 5.0 μm in the liquid crystal layer thickness.

What should be particularly noted is that, with the conventional configuration 1 and 2, the response speed varies greatly with the voltage applied to the liquid crystal and that as the liquid crystal applied voltage is reduced, the response speed decreases remarkably. With the configuration of this invention, on the other hand, it is seen that the response speed exhibits almost no dependence on the liquid crystal applied voltage and remains nearly constant. From this characteristic, it is found that this invention produces no trailing image, a drawback that occurs in the prior art particularly when a dynamic image is displayed in a half-tone mode.

The viewing angle characteristic of this invention was more than 140 degrees in the vertical and horizontal directions, which compares favorably with those of the conventional configurations 1 and 2. Further, the color tone variation and the gradation inversion recognized when viewed at a particular angle, which are the problems of the conventional configuration 2, were mitigated.

The color tone variation is a phenomenon wherein, assuming the direction of an in-plane component of the lateral electric field to be 0 degree, the region along the direction of about 45 degrees and 225 degrees, for example, changes its color from white to yellow (or blue) and the area along the direction of about −45 degrees and 135 degrees changes to blue (or yellow). The gradation inversion is a phenomenon wherein, when viewed at an oblique angle, white changes to yellow or blue. These phenomena occur because, when white is displayed, a change in retardation due to inclination of the viewing angle causes the liquid crystal layer near the upper substrate and the liquid crystal layer near the lower substrate to compensate for each other.

As can be seen from the foregoing description, this invention provides a response speed of less than 30 ms, the minimum requirement for displaying a dynamic image. An additional advantage is a further improvement of the viewing angle, compared to the conventional configuration. Because a material with greater refractive index anisotropy Δn than that of the conventional configuration 2 can be used, a wider range of materials becomes available. Further, because the thickness of the liquid crystal layer can be set larger, the gap between the substrates is more easily made uniform, improving the uniform distribution of brightness. The thicker liquid crystal layer contributes to a shorter liquid crystal injection time.

The cross-sectional structure of the thin-film transistor TFT and the electrode arrangement employed in Embodiment 1 are just one example, and it is possible to use another TFT structure and electrode arrangement (including one in which the counter electrodes are placed on the color filter substrate) in accordance with this invention.

Embodiment 2 to Embodiment 5

Embodiment 2 to Embodiment 5 are examples of a configuration with normally open display characteristics and optical compensation cells. They are similar in configuration to Embodiment 1 except for the following.

Figure 23:
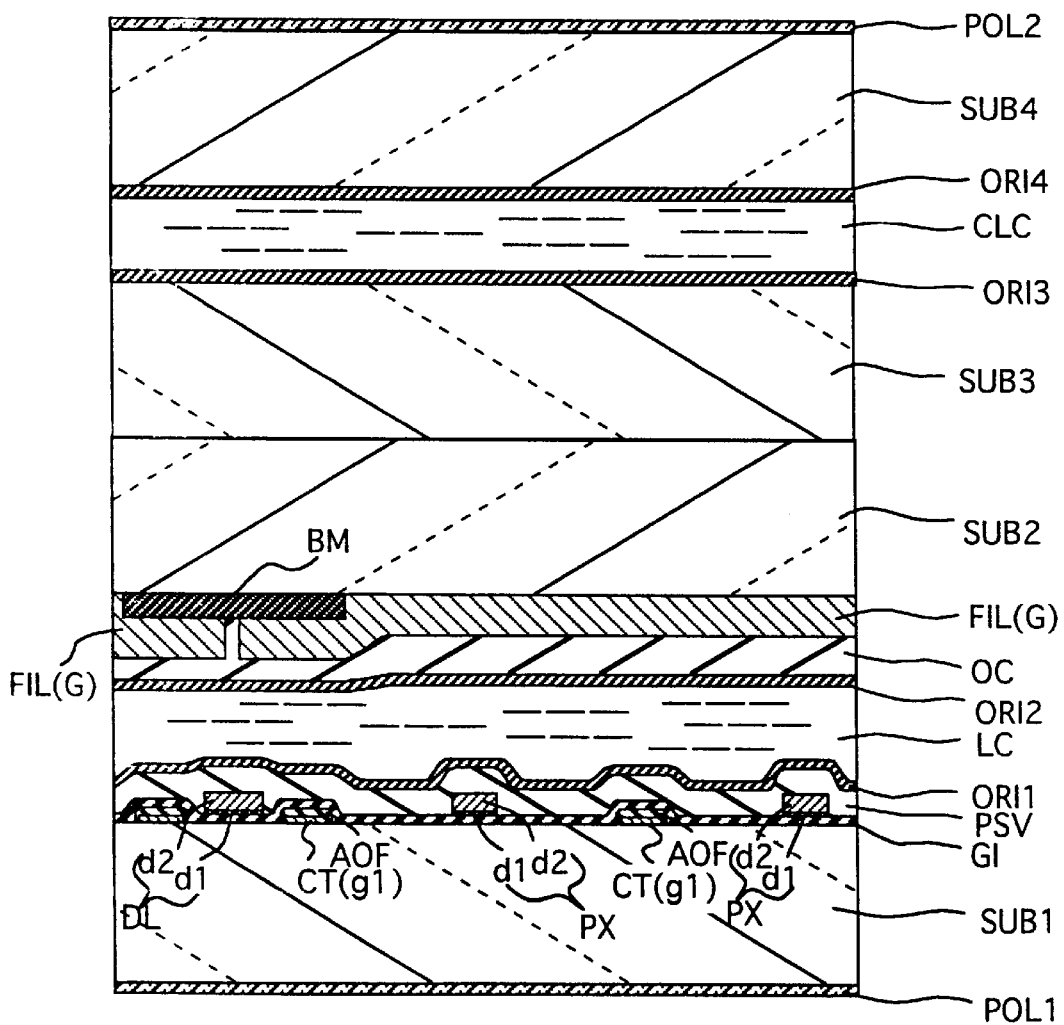
FIG. 23 is a cross section of the pixel taken along the line 3—3 of FIG. 1 in Embodiments 2 to 8.

A cross-sectional structure of Embodiment 2 to Embodiment 5 is shown in FIG. 23. The structure includes drive liquid crystal cells having drive electrodes CT, PX and thin-film transistors TFT, and optical compensation liquid crystal cells with no electrodes. Embodiment 2 has a configuration such that only the optical compensation liquid crystal cells are added to Embodiment 1. Embodiment 3 has a configuration similar to that of Embodiment 2 with an increased refractive index anisotropy Δn of the liquid crystal material of the drive liquid crystal cells. Embodiment 4 has a configuration similar to that of Embodiment 2 with the polarizing axis of the polarizer optimized. Embodiment 5 has a configuration in which the initial twist angle θ of the drive liquid crystal cells is optimized.

The initial twist angle 0, initial orientation angles β1, β2, thickness of the liquid crystal layer, dielectric anisotropy Δε of the liquid crystal material, and refractive index anisotropy Δn, all for Embodiment 2 to Embodiment 5, are shown in Table 1.

TABLE 1

| | θ degree | θ2 degree | d (μm) | Δn | (Δn.d)' (nm) | ↓ degree (↓1 = 0 degree) | β1 degree | β2 degree | β3 degree | β4 degree |
| --- | --- | --- | --- | --- | --- | --- | --- | --- | --- | --- |
| Emb. 2 | 90 | 90 | 5.0 | 0.084 | 215 | 90 | −45 | 45 | −45 | 45 |
| Emb. 3 | 90 | 90 | 5.0 | 0.25 | 650 | 90 | −45 | 45 | −45 | 45 |
| Emb. 4 | 90 | 90 | 5.0 | 0.25 | 650 | 110 | −45 | 45 | −45 | 45 |
| Emb. 5 | 100 | 100 | 5.0 | 0.25 | 650 | 110 | −50 | 50 | −40 | 40 |

The optical compensation liquid crystal cells comprise, as shown in FIG. 23, a lower substrate SUB3, an upper substrate SUB4, a liquid crystal composition CLC held between these substrates, an orientation film ORI3 on the lower substrate SUB3 side, and an orientation film ORI4 on the upper substrate SUB4 side.

Figure 24A:
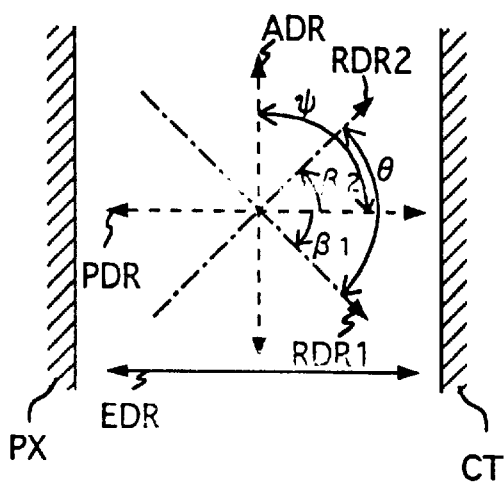
FIG. 24(a) and FIG. 24(b) are diagrams showing the relation between the direction of applied electric field, the rubbing direction of the drive liquid crystal cells and optical compensation liquid crystal cells, the initial orientation angle, and the polarizing axes of the polarizers in Embodiments 2 to 8.
Figure 24B:
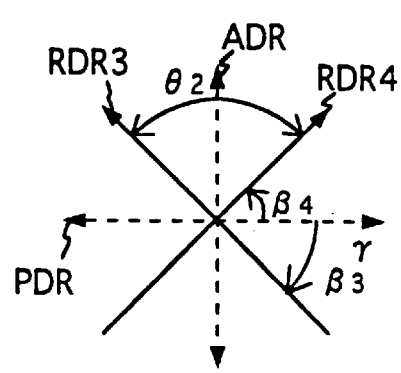

FIGS. 24(a) and 24(b) show the rubbing direction of the drive liquid crystal cells, the initial orientation angle and the polarizing axis of the polarizer, and the rubbing direction of the optical compensation liquid crystal layer (orientation direction near the orientation film). The orientation film ORI3 is rubbed in the RDR3 direction, and the orientation film ORI4 is rubbed in the RDR4 direction. β3 is the initial orientation angle between the rubbing direction RDR3 and the applied electric field direction EDR of the drive liquid crystal cell, and β4 is the initial orientation angle between the rubbing direction RDR4 and the applied electric field direction EDR of the drive liquid crystal cell.

The product of Δn of the liquid crystal layer of the optical compensation liquid crystal cell and the thickness d of the liquid crystal layer will be referred to as retardation (Δn·d)'. The twist angle θ2 is a twist angle of the optical compensation liquid crystal layer. The retardation (Δn·d)' of the optical compensation liquid crystal layer, the twist angle θ2, and the initial orientation angles β3, β4 are shown in Table 1. Here, the relationship among β1, β2, β3 and β4 is |β3−β4|≈|β1−β2|, and β3 crosses β2 nearly perpendicularly. For the optical compensation liquid crystal cells of this invention films holding cholesteric liquid crystal therebetween which have an optical characteristic identical to that of the optical compensation cells of Embodiments 2 to 5 may be used.

The arrangement of the polarizing axis of the polarizer used in Embodiments 2 to 5 is shown in Table 1. The direction of the polarizing axis of the polarizer POL1 on the backlight input side is denoted by PDR and the direction of the polarizing axis of the polarizer POL2 on the output side is denoted by ADR.

Figure 25A:
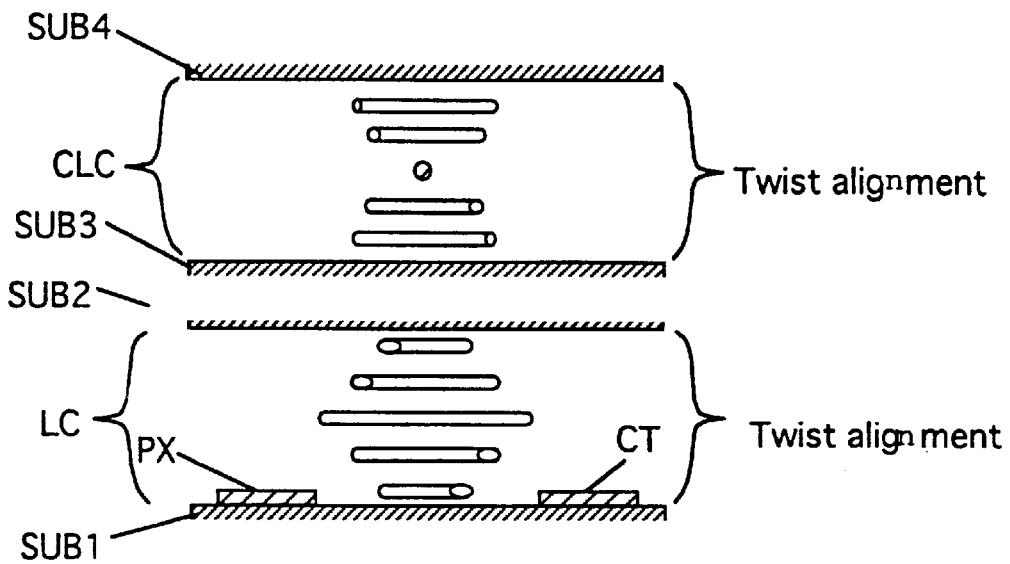
FIG. 25(a) and FIG. 25(b) are diagrams showing the action of the liquid crystal as seen from a direction of cross section in Embodiments 2 to 8.
Figure 25B:
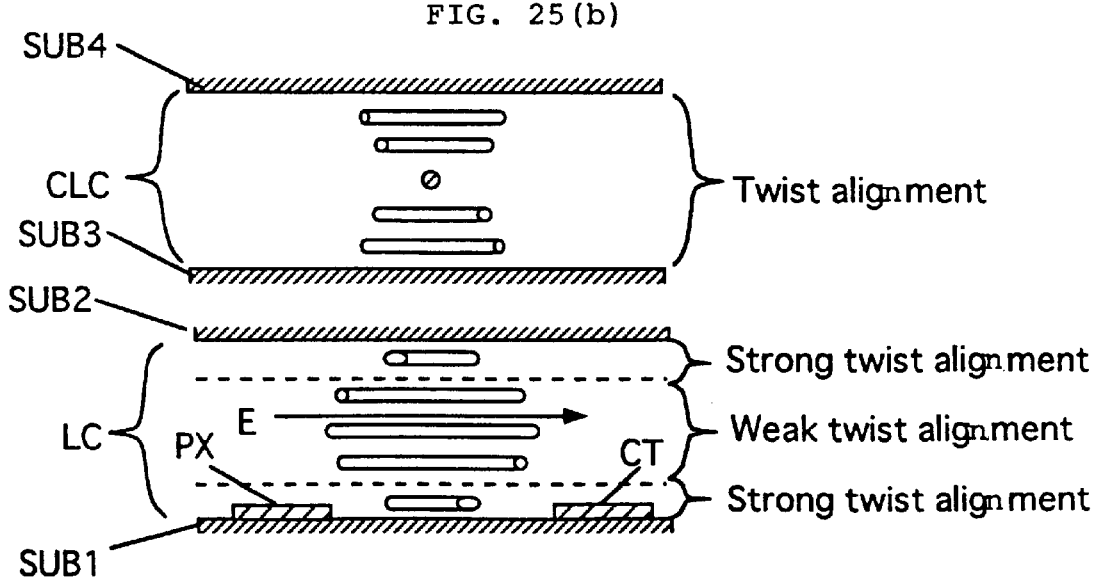

The principle of driving the liquid crystal in Embodiments 2 to 5 is illustrated in FIGS. 25(a) and 25(b). To achieve a higher contrast ratio with a lower voltage than in Embodiment 1, the liquid crystal molecules are oriented in a state shown in FIG. 25(b) by applying a voltage to enable black display. That is, the liquid crystal cells of Embodiments 2 to 5 have their liquid crystal molecules near the interface strongly twisted and the liquid crystal molecules in the central portion weakly twisted. The phrase "weakly twisted" refers to a state in which the ratio, twist angle/layer thickness, is small and the phrase "strongly twisted" refers to a state in which the ratio twist angle/layer thickness, is large. Thus, by arranging the optical compensation liquid crystal layer and polarizers in such a way as to compensate for this orientation, it is possible to realize a high contrast ratio with a low voltage.

Figure 26:
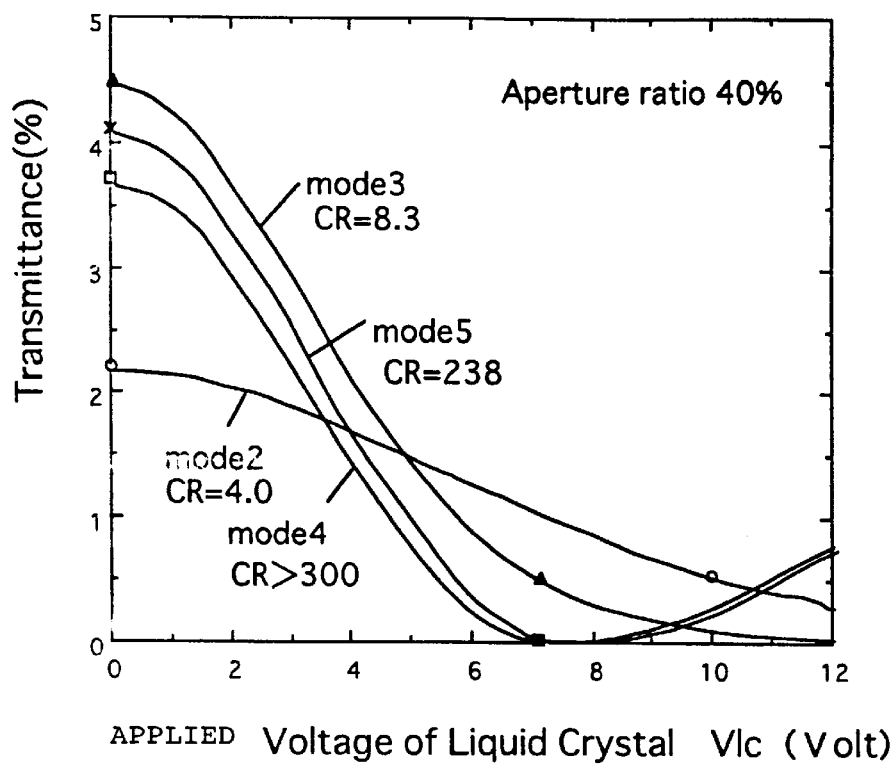
FIG. 26 is a graph showing the relation between the liquid crystal applied voltage and the transmittance in Embodiments 2 to 5.

The following characteristics of the liquid crystal display device with this configuration are obtained. In Embodiments 2 to 5, the response speed characteristic obtained is equivalent to that of Embodiment 1. The relation between the drive voltage Vlc and the transmittance T is shown in FIG. 26. It is seen that the contrast ratio, the drive voltage and the maximum transmittance are improved progressively roughly in the order of the embodiment numbers. In Embodiment 5 in particular, a contrast ratio of 100 or higher and a maximum transmittance (absolute transmittance of the panel during a white display) of 4.1% are obtained for the drive voltage of 7 V.

Figure 27:
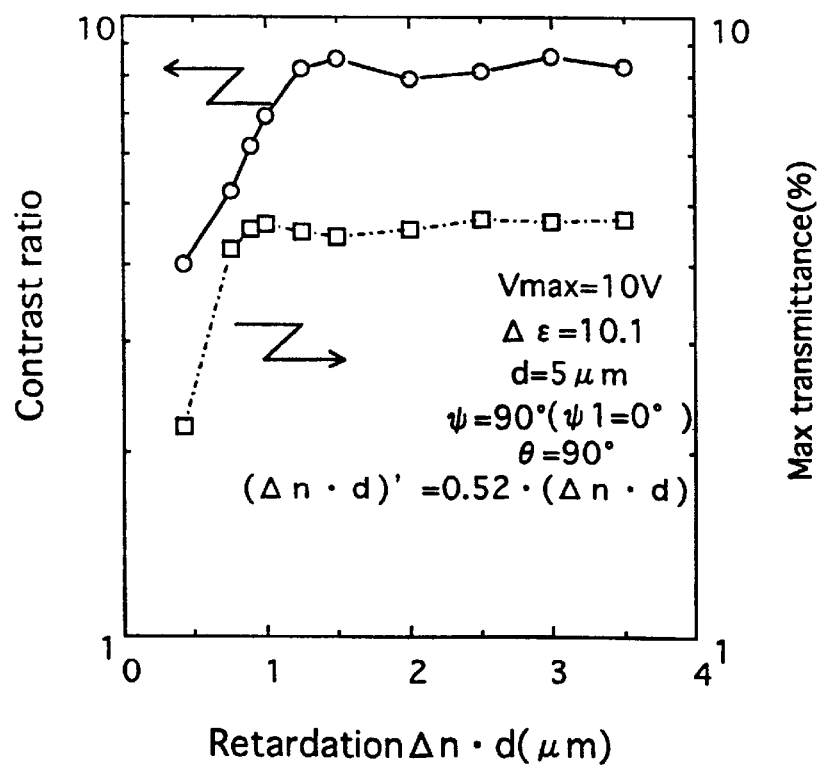
FIG. 27 is a graph showing the relation between the retardation, contrast ratio and white display transmittance of the liquid crystal cells in Embodiments 2 to 5.

FIG. 27 shows the relation between the retardation of the drive cell, the contrast ratio, and the maximum transmittance. From this figure, it is seen that the optimum retardation needs to be 750 nm or higher to produce a sufficient transmittance, and preferably 1250 nm or higher produces a sufficient contrast ratio.

Figure 28:
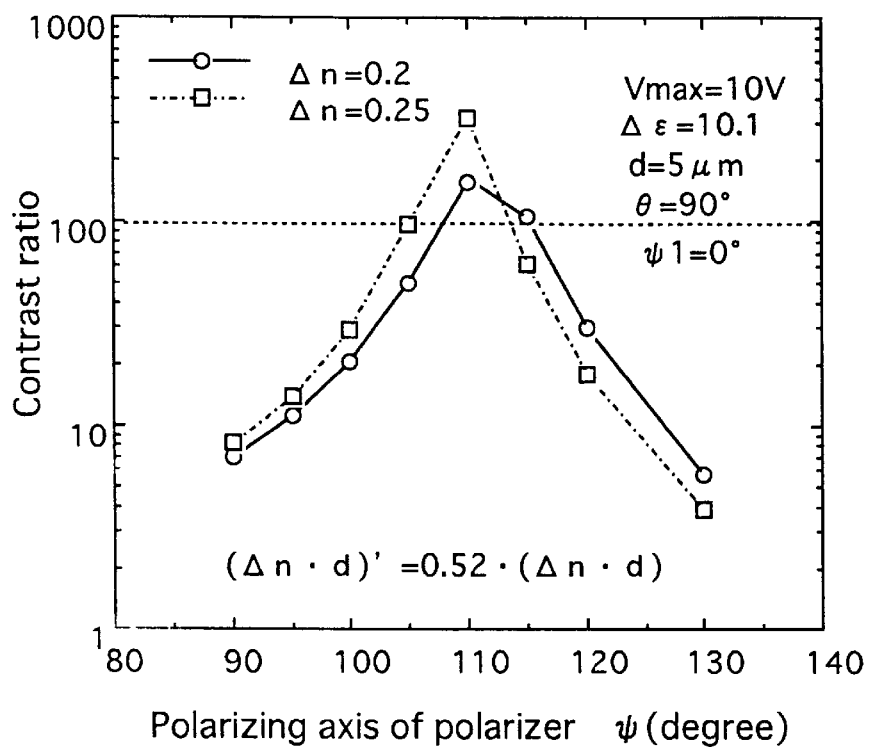
FIG. 28 is a graph showing the relation between the polarizing axis arrangement of polarizers and the contrast ratio in Embodiments 2 to 5.
Figure 29:
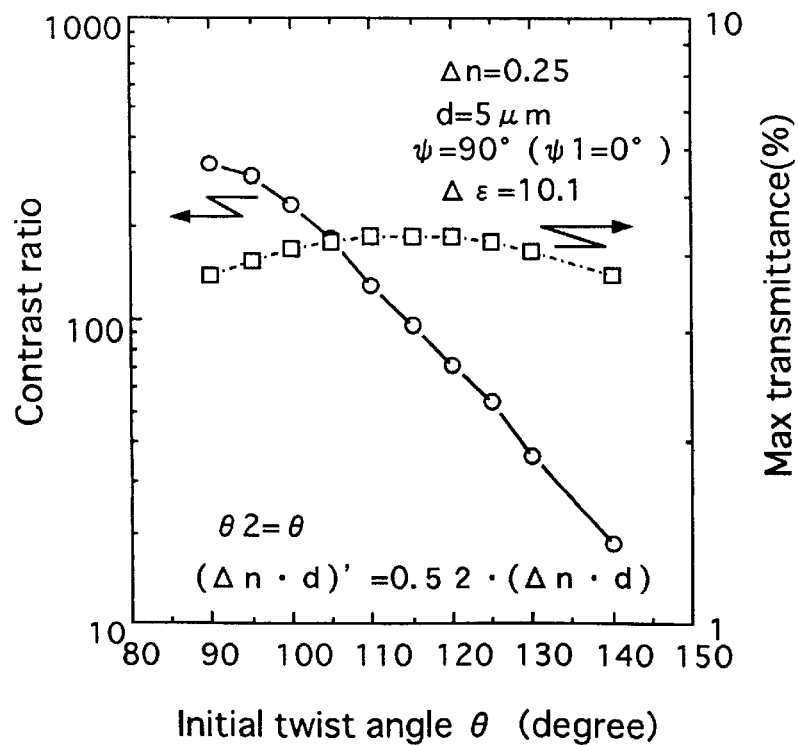
FIG. 29 is a graph showing the relation between the initial twist angle, contrast ratio and white display transmittance of the liquid crystal cells in Embodiments 2 to 5.

FIG. 28 shows the relation between the contrast ratios of the liquid crystal display device of Embodiments 2 to 5 and the polarizer arrangement φ=|φ1−φ2|. It is seen from FIG. 28 that, to produce a sufficient contrast ratio, the optimal relation φ=|φ1−φ2| of the polarizing axis of the polarizer needs to be 90 degrees to 120 degrees, preferably 95 degrees to 115 degrees. FIG. 29 shows the relation between the initial twist angle of the drive liquid crystal cells, the contrast ratio and the maximum transmittance. Here the twist angle of the optical compensation cell is set to θ2=θ.

It is seen from FIG. 29 that the initial twist angle is preferably set in a range between 90 degrees and 115 degrees to realize a sufficient contrast ratio and the maximum transmittance at the same time. The retardation (Δn·d)' of the optical compensation liquid crystal layer is preferably set in a range between 0.4·(Δn·d) and 0.6·(Δn·d), and setting the retardation at around (Δn·d)·=0.52·(Δn·d) in particular assures optimization.

Embodiment 6 to Embodiment 8

The configurations of Embodiments 6 to 8 are examples of a normally closed configuration with the optical compensation cells and are similar to those of Embodiments 2 to 5, except for the following.

The cross-sectional structures of Embodiments 6 to 8 are similar to those of Embodiments 2 to 5 and are shown in FIG. 23. Embodiments 6 to 8 have drive liquid crystal cells with drive electrodes CT, PX and thin-film transistors TFT, and optical compensation liquid crystal cells without electrodes.

Embodiment 6, unlike Embodiment 2, matches the retardation (Δn·d)' of the optical compensation liquid crystal cell with the retardation (Δn·d) of the drive cell. Embodiment 7 has a configuration in which the refractive index anisotropy Δn of the liquid crystal material of the drive liquid crystal cell is set to be large and the retardation (Δn·d)' of the optical compensation liquid crystal cell is matched with the retardation (Δn·d) of the drive cell. Embodiment 8 has a configuration in which the initial twist angle θ of Embodiment 7 is changed.

The initial twist angle θ, initial orientation angles β1, β2, thickness of the liquid crystal layer, and Δε and Δn of the liquid crystal material, all used in Embodiments 6 to 8, are shown in Table 2.

TABLE 2

|  | θ degree | θ2 degree | d (μm) | Δn | (Δn.d)' (nm) | degree (↓1 = 0 degree) | β1 degree | β2 degree | β3 degree | β4 degree |
| --- | --- | --- | --- | --- | --- | --- | --- | --- | --- | --- |
| Emb. 6 | 90 | 90 | 5.0 | 0.084 | 420 | 90 | −45 | 45 | −45 | 45 |
| Emb. 7 | 90 | 90 | 5.0 | 0.25 | 1250 | 90 | −45 | 45 | −45 | 45 |
| Emb. 9 | 140 | 140 | 5.0 | 0.25 | 1250 | 90 | −45 | 45 | −45 | 45 |

The retardation (Δn·d)', twist angle θ2, and the initial orientation angles β3, β4 of the optical compensation liquid crystal layer used in Embodiments 6 to 8 are also shown in Table 2. Definitions of these parameters are the same as those of Embodiments 2 to 5. The relation among β1, β2, β3 and β4 is |β3–β4|≈|β1–β2|, with β3 crossing β2 virtually at right angles.

The optical compensation liquid crystal cells may use films holding cholesteric liquid crystal therebetween which have an optical characteristic identical to that of the optical compensation cells of the previous embodiments. The arrangement of the polarizing axis of the polarizer used in Embodiments 6 to 8 is also shown in Table 2.

The principle of liquid crystal driving is similar to that of Embodiments 2 to 5 and is shown in FIGS. 25(a) and 25(b). Unlike Embodiments 2 to 5, Embodiments 6 to 8 also have the retardation (Δn·d)' of the optical compensation liquid crystal cell matched with the retardation (Δn·d) of the drive liquid crystal cell. Hence, a normally closed characteristic wherein the transmittance increases with the voltage applied to the liquid crystal is obtained.

Figure 30:
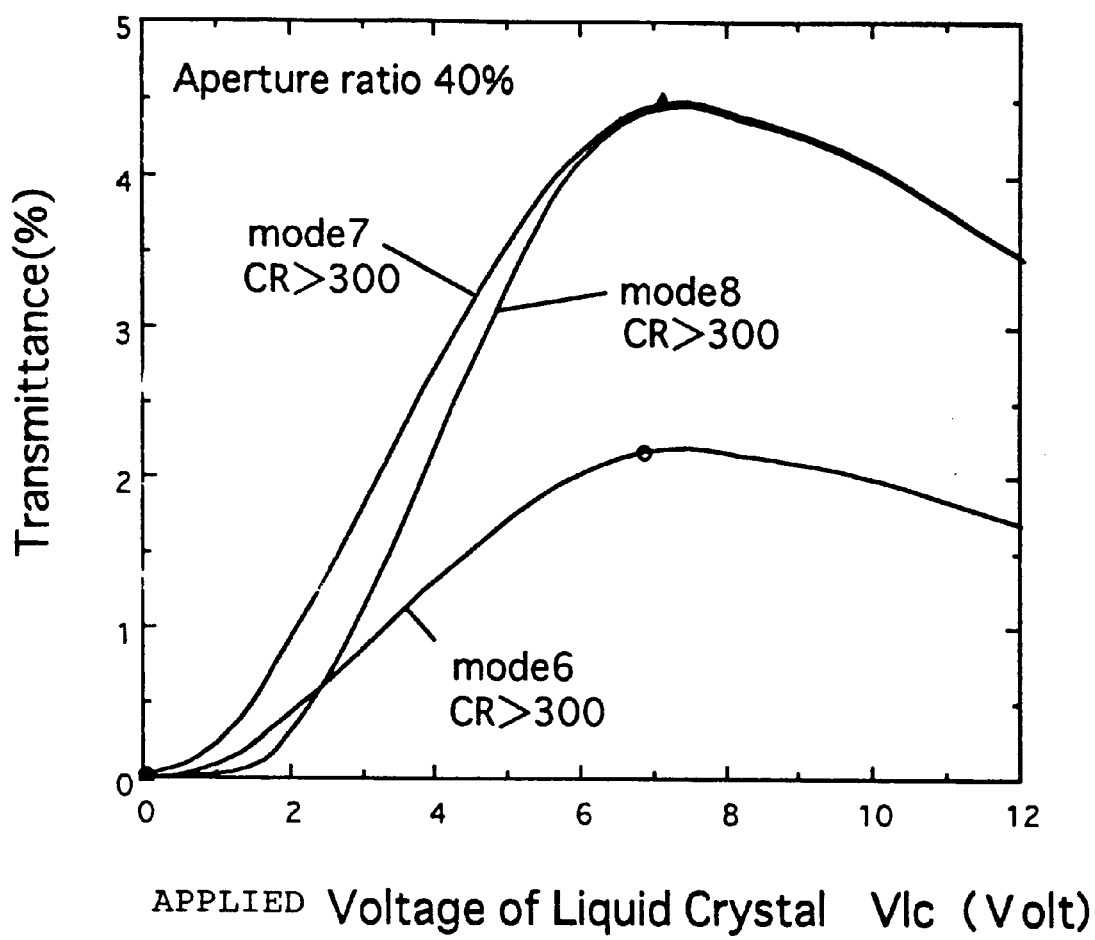
FIG. 30 is a graph showing the relation between the liquid crystal applied voltage and the transmittance in Embodiments 6 to 8.

FIG. 30 shows the relation between the drive voltage Vlc and the transmittance T for Embodiments 6 to 8. Embodiments 6 to 8 produce a black display (low transmission state) when no voltage is applied. When no voltage is applied, the liquid crystal molecules are oriented in an ideally twisted state making the optical compensation produced by the optical compensation cell easy. Hence, an ideal black level, i.e., a transmittance infinitely close to zero, can be achieved. It is therefore possible to widen the margin for variations in the manufacturing process, particularly variations in the gap between substrates, allowing for a stable manufacture of high-contrast products.

Embodiment 7 provides a contrast ratio of 100 or higher and a maximum transmittance (absolute transmittance of the panel during white display) of 4.5% for a drive voltage of 7 V. The response speed characteristics in Embodiments 6 and 7 are comparable to those of Embodiment 1.

is 12 ms, the fall time is 20 ms and the response time is 32 ms. The initial twist angle therefore contributes to changing the drive voltage that brings about the maximum transmittance, and it is preferably set in a range from 70 degrees to 160 degrees.

Embodiment 9 to Embodiment 13

Embodiments 9 to 13 have a normally open configuration with a uniaxial phase film and are similar to the configuration of Embodiment 1, except for the following.

Figure 31:
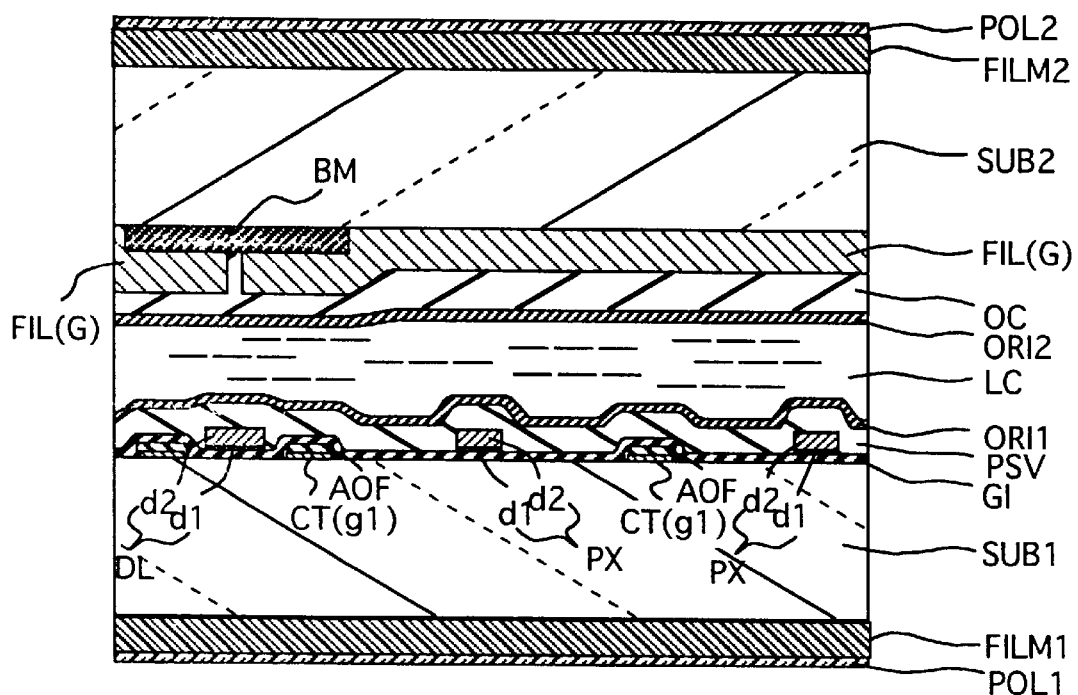
FIG. 31 is a cross section of the pixel taken along the line 3—3 of FIG. 1 in Embodiments 9 to 13.

The cross-sectional structure of Embodiments 9 to 13 is shown in FIG. 31. In these embodiments, uniaxial phase films FILM1 and FILM2 are arranged on the outer sides of the substrates SUB1, SUB2 so as to hold them therebetween. Embodiment 9 has a configuration in which the uniaxial phase film FILM1 and FILM2 is added to Embodiment 1. Embodiment 10 has a configuration such that the lagging axis of the phase film of Embodiment 9 is changed. Embodiment 11 has the configuration such that the retardation of the phase films of Embodiment 10 is differentiated between the upper and lower films. Embodiment 12 has a configuration such that the refractive index anisotropy Δn of the liquid crystal material of Embodiment 11 is increased. Embodiment 13 has a structure such that the initial twist angle of Embodiment 12 is changed.

The lagging axes γ1, γ2 of the uniaxial phase films and the retardations (Δn·d)1, (Δn·d)2 used in Embodiments 9 to 13 are shown in Table 3. γ1 represents an angle between the lagging axis LDR1 of the lower phase film FILM1 and the direction of the electric field EPR and γ2 represents an angle between the lagging axis LDR2 of the upper phase film FILM2 and the direction of the electric field EDR. Both of these angles are defined as positive for a counterclockwise rotation with respect to the direction of the electric field EDR.

TABLE 3

| | θ degree | d (μm) | Δn | (Δn.d)1 (nm) | (Δn.d)2 (nm) | ↓ degree (↓1 = 0 degree) | γ1 degree | γ2 degree | β3 degree | β2 degree |
|---|---|---|---|---|---|---|---|---|---|---|
| Emb. 9 | 90 | 3.0 | 0.084 | 55 | 55 | 101 | −45 | 45 | −45 | 45 |
| Emb. 10 | 90 | 5.0 | 0.084 | 110 | 110 | 101 | −22.5 | 22.5 | −45 | 45 |
| Emb. 11 | 90 | 5.0 | 0.084 | 90 | 130 | 97 | −22.5 | 22.5 | −45 | 45 |
| Emb. 12 | 90 | 5.0 | 0.25 | 260 | 390 | 100 | −22.5 | 22.5 | −45 | 45 |
| Emb. 13 | 104 | 5.0 | 0.25 | 260 | 390 | 100 | −25 | 25 | −50 | 50 |

As to the relation among the retardation, contrast ratio and maximum transmittance of the drive cells, a comparison between Embodiment 6 and Embodiment 7 shows that the maximum transmittance is improved in Embodiment 7 over Embodiment 6. Therefore, it is desirable for the optimum retardation to be set higher than 750 nm as in Embodiments 2 to 5. The polarizer arrangement φ=|φ1−φ2| is preferably set close to 90 degrees.

Figure 32A:
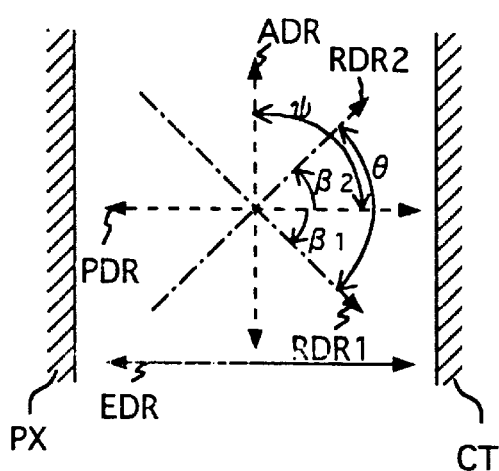
FIG. 32(a) and FIG. 32(b) are diagrams showing the relation between the direction of applied electric field, the rubbing direction of liquid crystal cells, the initial orientation angle, the polarizing axes of polarizers, and the lagging axis of phase shifter in Embodiments 9 to 13.

Further, as in Embodiment 8, by increasing the initial twist angle to more than 90 degrees, it is possible to change the liquid crystal applied voltage at which the transmittance starts to increase, i.e., the threshold voltage. Hence, the voltage amplitude contributing to the display and ranging from the threshold voltage to a voltage for the maximum transmittance can be reduced. This in turn reduces the signal output range of the video signal driving circuit. In other words, the video signal driving circuit, particularly the signal driver, can be reduced in circuit size. In Embodiment 8, the response speed is slightly slower, that is, the rise time (Δn·d)1 represents the retardation of the lower phase film and (Δn·d)2 represents the retardation of the upper phase film. FIG. 32(a) shows their angular relation.

Figure 32B:
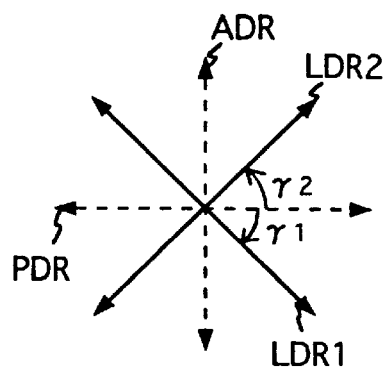

The retardation Δn·d of the optical compensation liquid crystal layer, the initial twist angle θ, and the initial orientation angles β1, β2 used in Embodiments 9 to 13 are also shown in Table 3, and FIG. 32(b) shows their angular relation. The polarizing axes of the polarizers used in Embodiments 9 to 13 are shown in Table 3 as well, and FIG. 32(b) shows their angular relation.

The principle of driving the liquid crystal used in Embodiments 9 to 13 is identical with that of Embodiments 2 to 5. To realize a higher contrast ratio with a lower voltage than Embodiment 1, Embodiments 9 to 13 orient the liquid crystal in a state shown in FIG. 25(b), thereby enabling a black display. At a low voltage, the liquid crystal cells in Embodiments 9 to 13 assume a transitional state wherein the liquid crystal molecules near the interface are strongly twisted, while those in the central portion are weakly twisted. Thus, by arranging the phase films and the polarizers in such a way as to compensate for this orientation state, it is possible to achieve a high contrast ratio with a low voltage.

Embodiments 9 to 13 have response speed characteristics comparable to those of Embodiment 1.

Figure 33:
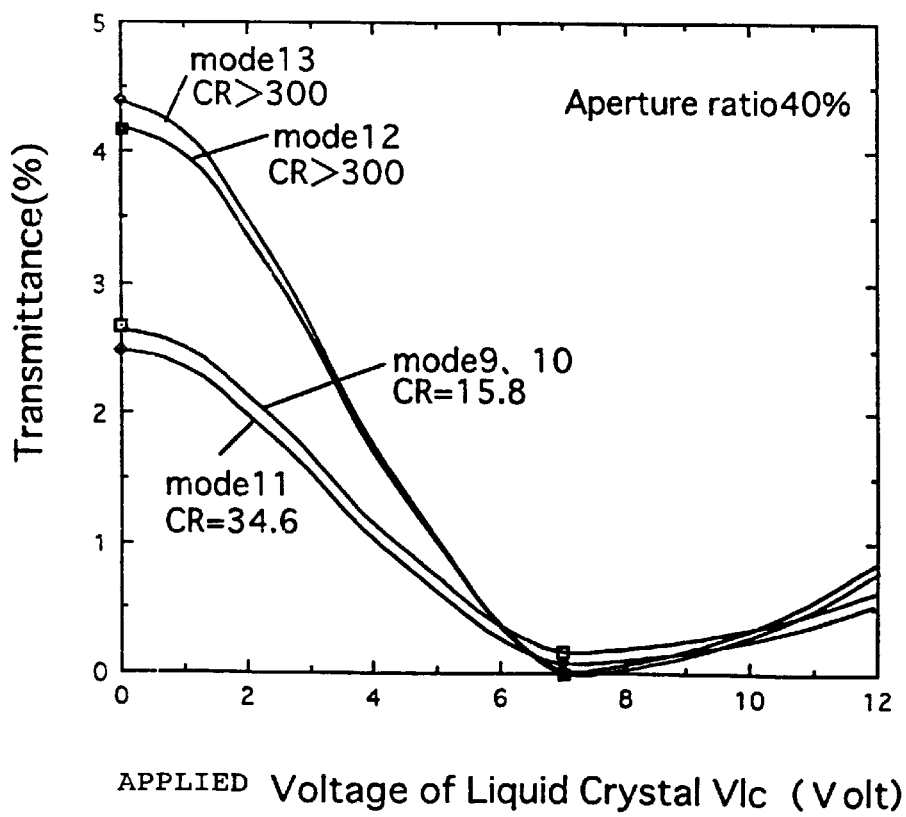
FIG. 33 is a graph showing the relation between the direction of applied electric field and the transmittance in Embodiments 9 to 13.

FIG. 33 shows the relation between the drive voltage Vlc and the transmittance T. It is seen that the contrast ratio and the maximum transmittance are improved progressively roughly in order of the embodiment number. In Embodiment 13 in particular, a contrast ratio of 100 or higher and the maximum transmittance (the absolute transmittance of the panel during white display) of 4.4% are obtained for the drive voltage of 7 V. As shown in FIG. 33, there is no characteristic change between Embodiment 9 and Embodiment 10. This suggests that the lagging axis angles γ1, γ2 of the phase plates and the retardations (Δn·d)1, (Δn·d)2 of the phase plate do not change their characteristics if γ1·(Δn·d)1 and γ2·(Δn·d)2 are constant even when their values are changed.

The relations, explained in conjunction with Embodiments 2 to 5, including the relation between the retardation of the drive cells, contrast ratio and maximum transmittance shown in FIG. 27, the relation between the polarizing axes of polarizers φ, contrast ratio and maximum transmittance shown in FIG. 28, and the relation between the initial twist angle of the drive cells, contrast ratio and maximum transmittance shown in FIG. 29, are also obtained in Embodiments 9 to 13. It is noted, however, that the relation (Δn·d) between the retardation of the drive cells and the retardations (Δn·d)1, (Δn·d)2 of phase shifters is so set that the relation (Δn·d)1+(Δn·d)2=0.52·(Δn·d) is met when γ1=−22.5 degrees and γ2=22.5 degrees. Thus, the optimum retardation needs to be set higher than 750 nm for a sufficient transmittance, and preferably more than 1250 nm to obtain a sufficient contrast ratio.

To obtain a sufficient contrast ratio, the relation φ=|φ1−φ2| of optimum polarizing axes of the polarizers needs to be set in a range of between 90 degrees and 120 degrees, preferably between 95 degrees and 115 degrees. Further, the initial twist angle should preferably be set in a range between 90 degrees and 115 degrees to achieve a satisfactory contrast ratio and a white display transmittance at the same time. The retardations of the phase films (Δn·d)1+(Δn·d)2 should preferably be set in the range from 0.4·(Δn·d) to 0.6·(Δn·d) to exhibit the characteristics shown in FIGS. 27 to 29. Setting them close to (Δn·d)1+(Δn·d)2=0.52·(Δn·d) results in characteristic optimization.

As shown in Embodiments 10 to 12, better optimization is achieved by setting (Δn·d)2>(Δn·d)1 or setting |γ2|>|γ1| for the lagging axis angles. More specifically, when |γ1|=|γ2|, it is desirable for the retardation to be set close to (Δn·d)2= 1.5·(Δn·d)1. Therefore, the preferable setting is (Δn·d)1< (Δn·d)2<2·(Δn·d)1 or |γ1|<|γ2|<2·|γ1|.

Figure 35:
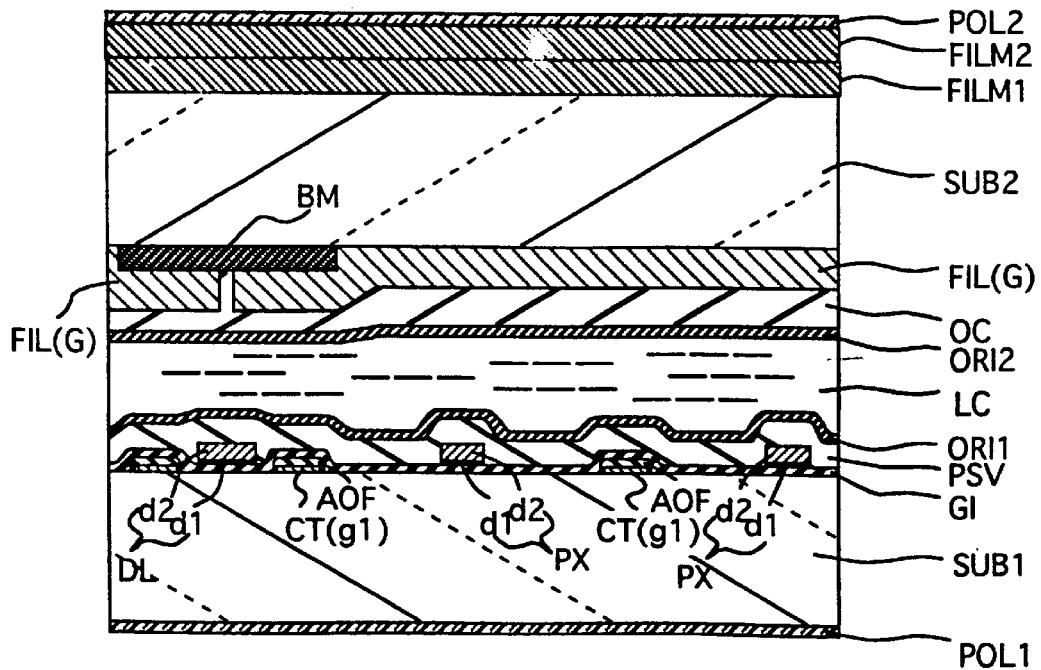
FIG. 35 is a cross section of the pixel taken along the line 3—3 of FIG. 1 in the arrangement where the two phase plates are both placed on the top.

A cross-sectional structure, in which two phase films FILM1, FILM2 are arranged on the upper side only, is shown in FIG. 35. Other arrangements can also bring about characteristics similar to those of these embodiments and they are within the scope of this invention.

Embodiment 14 to Embodiment 16

Embodiments 14 to 16 have a normally closed configuration with uniaxial phase films which is similar to that of Embodiments 9 to 13, except for the following.

The cross-sectional configuration of Embodiments 14 to 16 is shown in FIG. 31 and is similar to that of Embodiments 9 to 13. As in Embodiments 9 to 13, the uniaxial phase films FILM1, FILM2 are arranged on the outer sides of the substrates SUB1, SUB2 so as to hold them therebetween. Unlike Embodiment 9, Embodiment 14 has a configuration that matches the sum of retardations (Δn·d)1+(Δn·d)2 of the uniaxial phase films to the retardation (Δn·d) of the drive cell. Embodiment 15 has a configuration in which, under the retardation condition of Embodiment 14, the dielectric anisotropy Δn of the liquid crystal material of the drive liquid crystal cells is increased. Embodiment 16 is an example where the initial twist angle θ of Embodiment 15 is changed.

The lagging axes γ1, γ2 of the uniaxial phase films and the retardations (Δn·d)1, (Δn·d)2, both used in Embodiments 14 to 16, are shown in Table 4.

TABLE 4

| | θ degree | d (μm) | Δn | (Δn.d)1 (nm) | (Δn.d)2 (nm) | ↓ degree (↓1 = 0 degree) | γ1 degree | 65 2 degree | β3 degree | β2 degree |
|---|---|---|---|---|---|---|---|---|---|---|
| Emb. 14 | 90 | 5.0 | 0.084 | 210 | 210 | 90 | −22.5 | 22.5 | −45 | 45 |
| Emb. 15 | 90 | 5.0 | 0.25 | 625 | 625 | 90 | −22.5 | 22.5 | −45 | 45 |
| Emb. 16 | 140 | 5.0 | 0.25 | 625 | 625 | 90 | −22.5 | 22.5 | −75 | 75 |

γ1 represents the angle between the lagging axis LDR1 of the lower phase film FILM1 and the direction of electric field EDR, γ2 represents the angle between the lagging axis LDR2 of the upper phase film FILM2 and the direction of electric field EDR, (Δn·d)1 is the retardation of the lower phase film, and (Δn·d)2 is the retardation of the upper phase film. FIGS. 32(a) and 32(b) show their angular relationship.

The retardation Δn·d, initial twist angle θ and initial orientation angles β1, β2 for the liquid crystal layer of the drive cells used in Embodiments 14 to 16 are also shown in Table 4, and FIG. 32(a) shows their angular relationship. The polarizing axes of the polarizers used in Embodiments 14 to 16 are shown in Table 4 as well, and their angular relation is shown in FIG. 32(b).

The principle of driving the liquid crystal is shown in FIGS. 25(a) and 25(b) and is similar to that used in Embodiments 9 to 13. Unlike Embodiments 9 to 13, Embodiments 14 to 16 match the sum of the retardations (Δn·d)1+(Δn·d)2 of the uniaxial phase films to the retardation (Δn·d) of the drive liquid crystal cell so as to realize a normally closed characteristic, in which the transmittance increases with the voltage applied to the liquid crystal.

Figure 34:
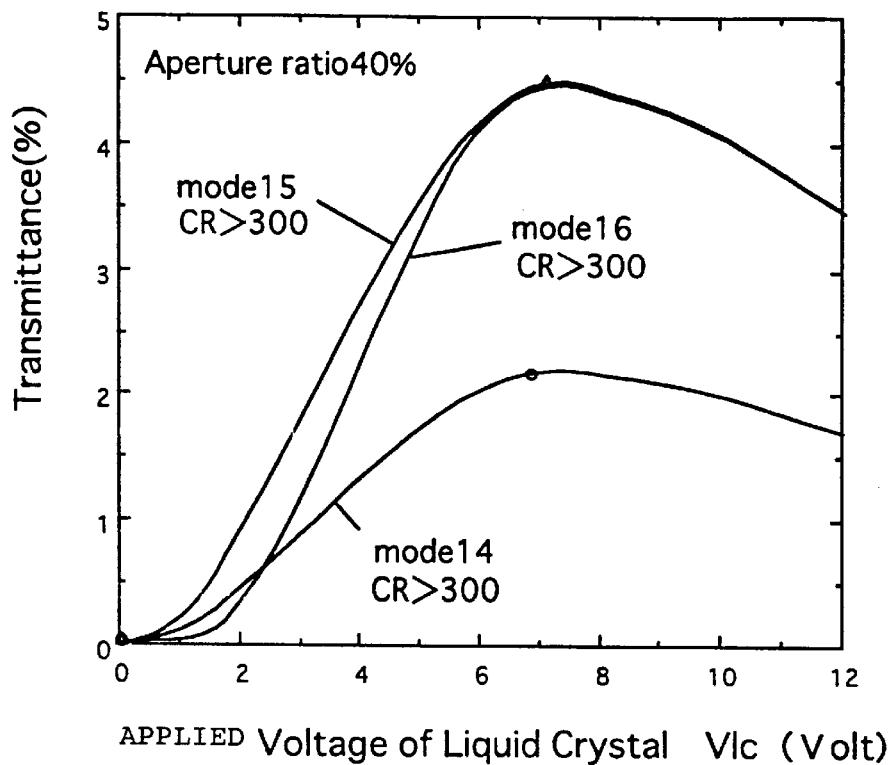
FIG. 34 is a graph showing the relation between the direction of applied electric field and the transmittance in Embodiments 14 to 16.

FIG. 34 shows the relation between the drive voltage Vlc and the transmittance T for Embodiments 14 to 16. Embodiments 14 to 16 produce a black display (low transmittance state) when no voltage is applied. When no voltage is applied, the liquid crystal molecules are oriented in an ideally twisted state making the optical compensation produced by the uniaxial phase films easy. Hence, an ideal black level, i.e., a transmittance infinitely close to zero, can be achieved. It is therefore possible to widen the margin for variations in the manufacturing process, particularly the variation in the gap between substrates, allowing for a stable manufacture of high-contrast products.

Embodiments 15 and 16 enable a contrast ratio of 100 or higher and a maximum transmittance (absolute transmittance of the panel during white display) of 4.5% for a drive voltage of 7 V. The response speed characteristics in Embodiments 14 and 15 are comparable to those of Embodiment 1.

As to the relation among the retardation, the contrast ratio and the maximum transmittance of the drive cells, a comparison between Embodiment 14 and Embodiment 15 shows that the maximum transmittance is improved in Embodiment 15 over Embodiment 14. Therefore, it is desirable for the optimum retardation to be set higher than 750 nm as in Embodiments 9 to 13. The polarizer arrangement φ=|φ1−φ2| is preferably set close to 90 degrees.

Further, as in Embodiment 16, by increasing the initial twist angle to more than 90 degrees, it is possible to change the liquid crystal applied voltage at which the transmittance starts to increase, i.e., the threshold voltage. Hence, the voltage amplitude contributing to the display and ranging from the threshold voltage to a voltage for the maximum transmittance can be reduced. This in turn reduces the signal output range of the video signal driving circuit. In other words, the video signal driving circuit, particularly the signal driver used in it, can be reduced in circuit size.

The response speed for this embodiment has slightly deteriorated. Embodiment 16 has a rise time of 12 ms, a fall time of 20 ms and a response time of 32 ms. This suggests that the initial twist angle contributes to changing the drive voltage that leads to the maximum transmittance, and so the initial twist angle is preferably set in a range between 70 degrees and 160 degrees.

A cross-sectional structure, in which two phase films FILM1, FILM2 are arranged on the upper side only, is shown in FIG. 35. Other arrangements can also achieve characteristics similar to those of these embodiments and they are within the scope of this invention.

Embodiment 17 to Embodiment 20

Embodiments 17 to 20 are examples of a configuration using a liquid crystal material with a negative dielectric anisotropy (Δε<0). This configuration is similar to that of Embodiment 1 except for the following. Embodiment 17 has a configuration where a liquid crystal material with a negative dielectric anisotropy (Δε<0) is used in Embodiment 1. Embodiment 18 has the configuration of Embodiment 17 with the polarizing axes of the polarizers optimized. Embodiment 19 has the configuration of Embodiment 18 with the initial twist angle θ optimized. Embodiment 20 has the configuration of Embodiment 19 with the retardation Δn·d and the polarizing axes of the polarizers optimized.

The initial twist angle θ, initial orientation angles β1, β2, thickness of the liquid crystal layer and Δn of the liquid crystal material used in Embodiments 17 to 20 are shown in Table 5.

TABLE 5

| | θ degree | d (μm) | Δn | ↓ degree (↓1 = 0 degree) | β1 degree | β2 degree |
|---|---|---|---|---|---|---|
| Emb. 17 | 5 | 5.0 | 0.084 | 90 | −2.5 | 2.5 |
| Emb. 18 | 5 | 5.0 | 0.084 | 96 | −20 | 20 |

TABLE 5-continued

| | θ degree | d (μm) | Δn | ↓ degree (↓1 = 0 degree) | β1 degree | β2 degree |
|---|---|---|---|---|---|---|
| Emb. 19 | 20 | 5.0 | 0.054 | 113 | −10 | 10 |
| Emb. 20 | 20 | 5.0 | 0.25 | 110 | −10 | 10 |

The arrangements of the polarizing axes of the polarizers used in Embodiments 17 to 20 are also shown in Table 5.

Figure 36:
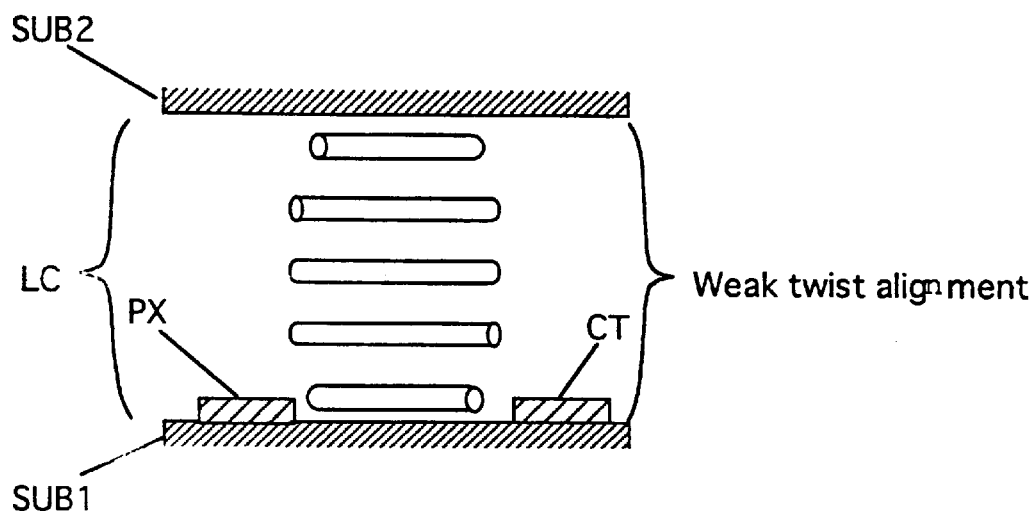
FIG. 36(a) and FIG. 36(b) are diagrams showing the action of the liquid crystal as seen from a direction of the cross section in Embodiments 17 to 20.
Figure 36B:
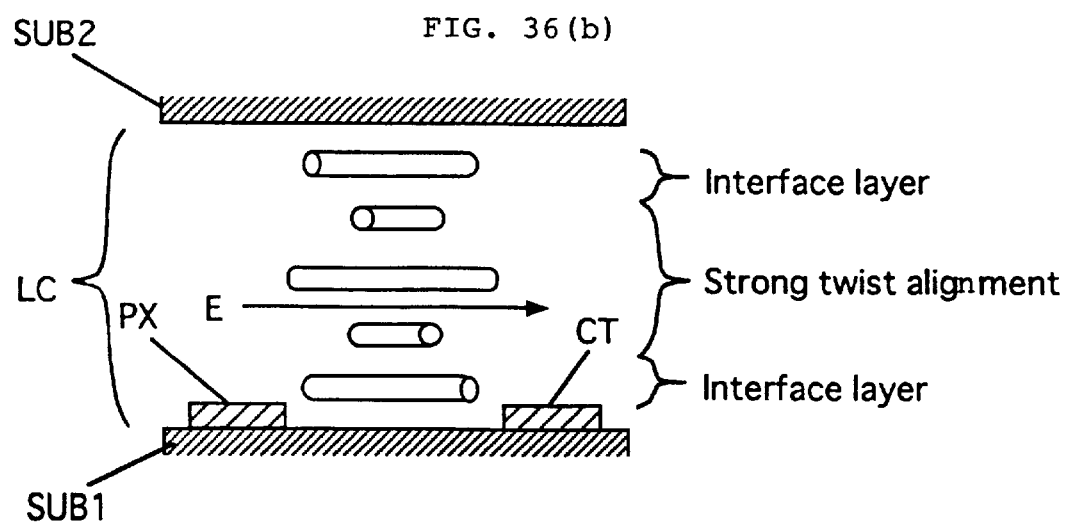

The principle of liquid crystal driving is illustrated in FIGS. 36(a) and 36(b). In the liquid crystal with a negative dielectric anisotropy, the major axes of liquid crystal molecules are reoriented in a direction perpendicular to the electric field application direction. Thus, with no voltage applied, the molecules assume a state in which they are weakly twisted counterclockwise from the substrate SUB2 to the substrate SUB1, as shown in FIG. 36(a). When a voltage is applied, the molecules near the central part of the liquid crystal layer change to a strongly clockwise-twisted state, with the molecules near the interfaces with the upper and lower layers are twisted counterclockwise.

By optimizing the polarizer positions in the weakly twisted state set up when no voltage is applied, a desirable black level (low transmittance state) can be obtained, and thus the display panel exhibits a normally closed characteristic in which the transmittance increases with the liquid crystal application voltage.

Figure 37:
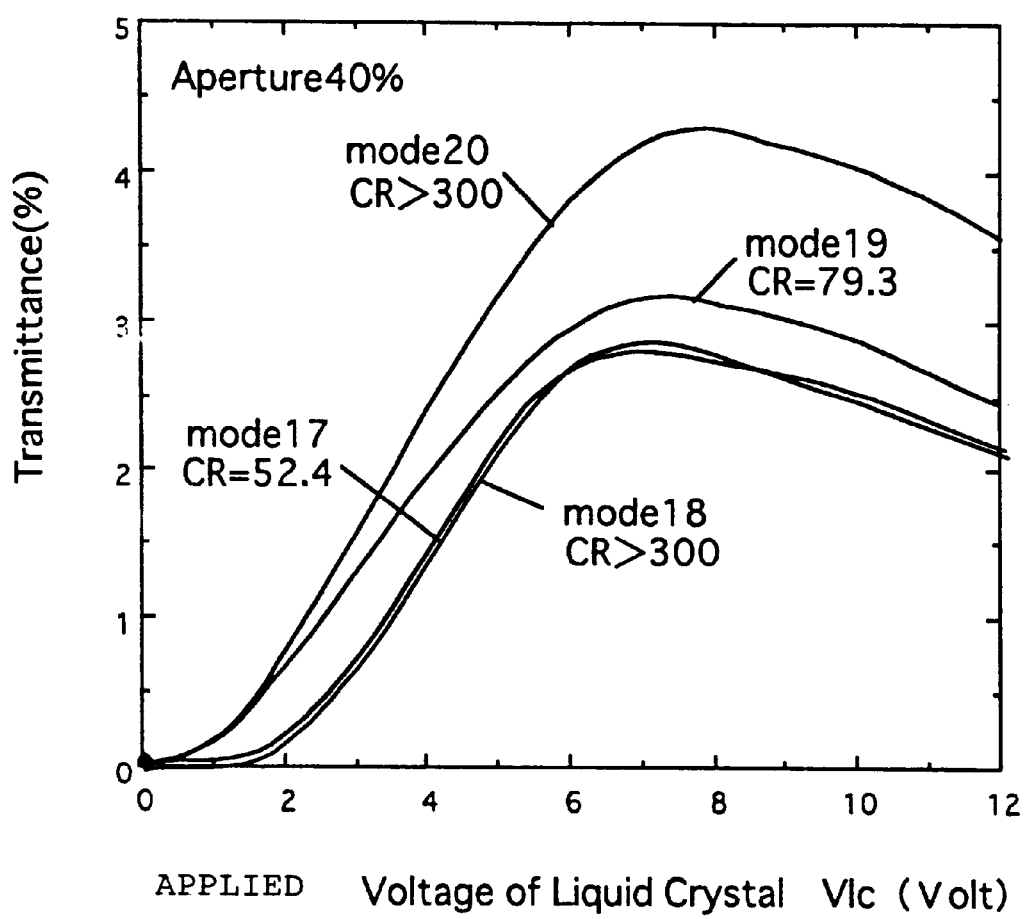
FIG. 37 is a graph showing the relation between the idirection of applied electric field and the transmittance in Embodiments 17 to 20.

The relation between the drive voltage Vlc and the transmittance T in Embodiments 17 to 20 is shown in FIG. 37. In Embodiments 17 to 20, a black display (low transmittance state) is produced when no voltage is applied. When no voltage is applied, the liquid crystal molecules are oriented in an ideally twisted state making the optimization produced by the polarizer arrangement easy. Hence, an ideal black level, i.e., a transmittance infinitely close to zero, can be realized. It is therefore possible to widen the margin for variations in the manufacturing process, particularly the variation in the gap between substrates, allowing for a stable manufacture of high-contrast products.

Embodiment 20 has a contrast ratio of 100 or higher and a maximum transmittance (an absolute transmittance of the panel during white display) of 4.3% for a drive voltage of 8 V. The response speed characteristics of Embodiments 19 and 20 are slightly slower than those of Embodiment 1, that is the rise time is 20 ms, the fall time is 16 ms and the response time is 36 ms.

As to the relation among the retardation, contrast ratio and maximum transmittance of the drive cells, comparison between Embodiment 14 and Embodiment 15 shows that the maximum transmittance is improved in Embodiment 20 over Embodiment 19. Therefore, it is desirable for the optimum retardation to be set higher than 750 nm as in Embodiments 2 to 5. The polarizer arrangement φ=|φ1−φ2| is preferably set close to 90 degrees.

In Embodiments 17 and 18, the response speed is slightly slower, that is, the rise time is 40 ms, the fall time is 20 ms and the response time is 60 ms. Further, by increasing the initial twist angle, it is possible to make a significant improvement in the response speed, particularly at the leading edge. That is, the greater the initial twist angle is, the faster the response speed is.

Comparison of Embodiment 18 and Embodiment 19 shows that as the initial twist angle is increased, the resulting contrast ratio after optimizing the polarizer arrangement deteriorates. Thus, there is a trade-off relationship between the response speed and the contrast ratio. To achieve a good balance between these characteristics, the initial twist angle is preferably set in a range between 20 and 50 degrees.

As to the arrangement of the polarizers, comparison between Embodiment 17 and Embodiment 18 indicates that the contrast ratio and the maximum transmittance can be improved by optimizing the polarizers from 90 degrees.

In Embodiments 17 to 20 it is also possible to enhance the contrast ratio, lower the applied voltage or produce a normally open characteristic by using the optical compensation liquid crystal layer and the phase films, as in Embodiments 2 to 16. The methods for achieving these objectives are also within the scope of this invention.

Embodiment 21

The configuration of Embodiment 21 is similar to that of Embodiment 1 except for the following. The initial orientation angle $\beta 1$ between the rubbing direction of the lower substrate RDR1 and the direction of the electric field EDR is set to −50 degrees and the initial orientation angle $\beta 2$ between the rubbing direction of the upper substrate RDR2 and the direction of electric field EDR is set to 40 degrees so that the upper and lower substrates are twisted 90 degrees.

When the liquid crystal drive electrodes (both pixel electrode PX and counter electrode CT) are formed on the lower substrate, the electric field parallel to the substrate surface (lateral electric field) is strong near the lower substrate and progressively weaker toward the upper substrate. Hence, the liquid crystal molecules near the lower substrate are more easily rotatable than those close to the upper substrate. The voltage required to reorient most of the liquid crystal molecules in the liquid crystal layer in the direction of the electric field EDR in Embodiment 21 can be lower than that of Embodiment 1. Embodiment 1 requires a voltage of about 12 V to produce a black display, while Embodiment 21 needs only about 10 v to realize the same black level as Embodiment 1.

While in this embodiment $\beta 1$ and $\beta 2$ are set at 50 degrees and 40 degrees, respectively, they may be set at 50 degrees and −40 degrees to produce the same effect. The essential configuration of Embodiment 21 is that, when the liquid crystal drive electrodes are arranged only on the lower substrate, the condition $|\beta 1|>|\beta 2|$ needs to be met, and when the liquid crystal drive electrodes are arranged only on the upper substrate, the condition $|\beta 1|>|\beta 2|$ needs to be satisfied.

The configuration of Embodiment 21 is applicable not only to Embodiment 1 but to Embodiments 2 to 20, and these configurations are within the scope of this invention.

As described above, this invention provides an active matrix type liquid crystal display device that realizes as wide a viewing angle as a CRT and a response speed fast enough to display a dynamic image.

What is claimed is:

1. A liquid crystal display device comprising:
   a pair of insulating substrates disposed opposite each other;
   a pair of orientation films formed over the insulating substrates;
   a liquid crystal composition held between the pair of orientation films;
   pixel electrodes and counter electrodes arranged to apply a lateral electric field almost parallel to surfaces of the substrates; and
   a pair of polarizers disposed with the pair of substrates held therebetween;
   wherein an initial orientation angle $\beta 1$ between an in-plane direction of the lateral electric field and an initial orientation direction on one orientation film side and an initial orientation angle $\beta 2$ between the in-plane direction of the lateral electric field and an initial orientation direction on the other orientation film side are in the relationship of $|\beta 1| \approx |\beta 2|$; and
   wherein an angle between the in-plane direction of the lateral electric field and a polarizing axis of one of the polarizers is almost zero.

2. A liquid crystal display device comprising:
   a pair of insulating substrates disposed opposite each other;
   a pair of orientation films formed over the insulating substrates;
   a liquid crystal composition held between the pair of orientation films;
   pixel electrodes and counter electrodes arranged to apply a lateral electric field almost parallel to surfaces of the substrates; and
   a pair of polarizers disposed with the pair of substrates held therebetween;
   wherein the liquid crystal composition has a positive dielectric anisotropy;
   wherein an initial orientation angle $\beta 1$ between an in-plane direction of the lateral electric field and an initial orientation direction on one orientation film side and an initial orientation angle $\beta 2$ between the in-plane direction of the lateral electric field and an initial orientation direction on the other orientation film side have opposite signs and are in the relationship of $|\beta 1 + \beta 2| \leq 20$ degrees; and
   wherein an angle between the in-plane direction of the lateral electric field and a polarizing axis of one of the polarizers is almost zero.

3. A liquid crystal display device according to claim 2, wherein 35 degrees $\leq |\beta 1| < 90$ degrees and 35 degrees $\leq |\beta 2| < 90$ degrees.

4. A liquid crystal display device according to claims 1, 2 or 3, wherein optical compensation liquid crystal cells are arranged on one of the upper side and the lower side of the pair of the opposing substrates.

5. A liquid crystal display device according to claim 4, wherein in the optical compensation liquid crystal cells, an initial orientation angle $\beta 3$ between an in-plane direction of the lateral electric field and an initial orientation direction on one orientation film side and an initial orientation angle $\beta 4$ between the in-plane direction of the lateral electric field and an initial orientation direction on the other orientation film side have the relationship, with respect to $\beta 1$ and $\beta 2$, of $|\beta 3 - \beta 4| \approx |\beta 1 - \beta 2|$, and the angle $\beta 3$ is almost perpendicular to the angle $\beta 2$.

6. A liquid crystal display device according to claim 5, wherein a product of a refractive index anisotropy of the liquid crystal composition in the optical compensation liquid crystal cell and a thickness of the liquid crystal layer $(\Delta n \cdot d)'$ and a product of a refractive index anisotropy of a liquid crystal composition in a drive liquid crystal cell and a thickness of the liquid crystal layer $(\Delta n \cdot d)$ is in the relationship of $0.4 \cdot (\Delta n \cdot d) \leq (\Delta n \cdot d)' \leq 0.6 \cdot (\Delta n \cdot d)$.

7. A liquid crystal display device according to claim 6, wherein an angle $\phi 1$ between a polarizing axis of one of the polarizers and the in-plane direction of the lateral electric field and an angle $\phi 2$ between a polarizing axis of the other polarizer and the in-plane direction of the in-plane electric field are in the relationship of 90 degrees $|\phi 1 - \phi 2| \leq 120$ degrees$\leq$.

8. A liquid crystal display device according to claim 6, wherein the angle β1 and the angle β2 are in the relationship of 90 degrees≦|β1–β2|≦115 degrees.

9. A liquid crystal display device according to claim 6, wherein a product of a refractive index anisotropy of the liquid crystal composition and a thickness of the liquid crystal layer (Δn·d) is (Δn·d)≧750 nm.

10. A liquid crystal display device according to claim 5, wherein a product of a refractive index anisotropy of the liquid crystal composition in the optical compensation liquid crystal cell and a thickness of the liquid crystal layer (Δn·d)' and a product of a refractive index anisotropy of a liquid crystal composition in a drive liquid crystal cell and a thickness of the liquid crystal layer (Δn·d) is in the relationship of (Δn·d)=(Δn·d)'.

11. A liquid crystal display device according to claim 10, wherein an angle φ1 between a polarizing axis of one of the polarizers and the in-plane direction of the lateral electric field and an angle φ2 between a polarizing axis of the other polarizer and the in-plane direction of the lateral electric field are in the relationship of

|φ1–φ2|=90 degrees.

12. A liquid crystal display device according to claim 10, wherein the angle β1 and the angle β2 are in the relationship of 70 degrees≦|β1–β2|≦160 degrees.

13. A liquid crystal display device according to claim 10, wherein a product of a refractive index anisotropy of the liquid crystal composition and a thickness of the liquid crystal layer (Δn·d) is (Δn·d)≧750 nm.

14. A liquid crystal display device according to claims 1, 2 or 3, wherein optical compensation phase films are arranged on one of the upper side, lower side and both sides of the pair of substrates.

15. A liquid crystal display device according to claim 14, wherein the optical compensation phase films hold a cholesteric liquid crystal therebetween.

16. A liquid crystal display device according to claim 14, wherein at least two of the optical compensation phase films are provided, with at least one film being arranged between one of the substrates and the polarizer and at least one other film being arranged between the other substrate and the polarizer.

17. A liquid crystal display device comprising:
  a pair of insulating substrates disposed opposite each other;
  a pair of orientation films formed over the insulating substrates;
  a liquid crystal composition held between the pair of orientation films,
  pixel electrodes and counter electrodes arranged to apply a lateral electric field almost parallel to surfaces of the substrates;
  a pair of polarizers disposed with the pair of substrates held therebetween;
  wherein an initial orientation angle β1 between an in-plane direction of the lateral electric field and an initial orientation direction on one orientation film side and an initial orientation angle β2 between the in-plane direction of the lateral electric field and an initial orientation direction on the other orientation film side are in the relationship of |β1|≈|β2|;
  wherein an angle between the in-plane direction of the lateral electric field and a polarizing axis of one of the polarizers is almost zero;
  wherein optical compensation phase films are arranged on one of the upper side, lower side and both sides of the pair of substrates;
  wherein at least two of the optical compensation phase films are provided, with at least one film being arranged between one of the substrates and the polarizer and at least one other film being arranged between the other substrate and the polarizer; and
  wherein an angle γ1 between one phase lagging axis of the optical compensation phase films and the in-plane direction of the lateral electric field, and an angle γ2 between the other phase lagging axis and the in-plane direction of the lateral electric field are γ1=β1/2 and γ2=β2/2.

18. A liquid crystal display device according to claim 17, wherein the sum of products (Δn·d)n of a refractive index anisotropy and a thickness of a liquid crystal composition in the optical compensation phase films, and a product (Δn·d) of a refractive index anisotropy and a thickness of a liquid crystal composition of drive liquid crystal cells are in the relationship of $$0.4 \cdot (\Delta n \cdot d) \leq \sum_{i=1}^{n} (\Delta n \cdot d)n \leq 0.6 \cdot (\Delta n \cdot d).$$

19. A liquid crystal display device according to claim 18, wherein an angle φ1 between a polarizing axis of one of the polarizers and the in-plane direction of the lateral electric field and an angle φ2 between a polarizing axis of the other polarizer and the in-plane direction of the lateral electric field are in the relationship of 90 degrees≦|φ1–φ2|≦120 degrees.

20. A liquid crystal display device according to claim 18, wherein the angle β1 and the angle β2 are in the relationship of 90 degrees≦|β1–β2|≦115 degrees.

21. A liquid crystal display device according to claim 18, wherein a product of a refractive index anisotropy of the liquid crystal composition and a thickness of the liquid crystal layer (Δn·d) is (Δn·d)≧750 nm.

22. A liquid crystal display device according to claim 17, wherein the sum of products (Δn·d)n of a refractive index anisotropy and a thickness of a liquid crystal composition in the optical compensation phase films, and a product (Δn·d) of a refractive index anisotropy and a thickness of a liquid crystal composition of drive liquid crystal cells are in the relationship of $$\sum_{i=1}^{n} (\Delta n \cdot d) = (\Delta n \cdot d).$$

23. A liquid crystal display device according to claim 22, wherein an angle φ1 between a polarizing axis of one of the polarizers and the in-plane direction of the lateral electric field and an angle φ2 between a polarizing axis of the other polarizer and the in-plane direction of the lateral electric field are in the relationship of |φ1–φ2|=90 degrees.

24. A liquid crystal display device according to claim 22, wherein the angle β1 and the angle β2 are in the relationship of 70 degrees≦|β1–β2|≦160 degrees.

25. A liquid crystal display device according to claim 22, wherein a product of a refractive index anisotropy of the liquid crystal composition and a thickness of the liquid crystal layer ($\Delta n \cdot d$) is ($\Delta n \cdot d$) $\geq$ 750 nm.

26. A liquid crystal display device according to claim 14, wherein at least two optical compensation phase films are provided, with at least two films being arranged between one of the substrates and the polarizer.

27. A liquid crystal display device according to claim 1, wherein one of the angles of $\beta 1$ and $\beta 2$ is a positive angle and the other of the angles $\beta 1$ and $\beta 2$ is a negative angle.

28. A liquid crystal display device comprising:

a pair of insulating substrates disposed opposite each other;

a pair of orientation films formed over the insulating substrates;

a liquid crystal composition held between the pair of orientation films;

pixel electrodes and counter electrodes arranged to apply a lateral electric field almost parallel to surfaces of the substrates; and a pair of polarizers disposed with the pair of substrates held therebetween;

wherein the liquid crystal composition has a negative dielectric anisotropy;

wherein an initial orientation angle $\beta 1$ between an in-plane direction of the lateral electric field and an initial orientation direction on one orientation film side and an initial orientation angle $\beta 2$ between the in-plane direction of the lateral electric field and an initial orientation direction on the other orientation film side have opposite signs and are in the relationship of 0 degree $\leq |\beta 1| \leq 55$ degrees and 0 degree $< |\beta 2| \leq 55$ degrees; and wherein an angle between the in-plane direction of the lateral electric field and a polarizing axis of one of the polarizers is almost zero.

29. A liquid crystal display device according to claim 28, wherein an angle $\phi 1$ between a polarizing axis of one of the polarizers and the in-plane direction of the lateral electric field and an angle $\phi 2$ between a polarizing axis of the other polarizer and the in-plane direction of the lateral electric field are in the relationship of 90 degrees $\leq \phi 1 - \phi 1 \leq 120$ degrees.

30. A liquid crystal display device according to claim 28, wherein the angle $\beta 1$ and the angle $\beta 2$ are in the relationship of 20 degrees $\leq |\beta 1 - \beta 2| \leq 50$ degrees.

31. A liquid crystal display device according to claim 28, wherein a product of a refractive index anisotropy of the liquid crystal composition and a thickness of the liquid crystal layer ($\Delta n \cdot d$) is ($\Delta n \cdot d$) $\geq$ 750 nm.

32. A liquid crystal display device according to claim 28, further comprising a pair of opposing insulating substrates, a pair of orientation films formed on the substrates to orientate a liquid crystal composition, and optical compensation liquid crystal cells holding the liquid crystal composition between the pair of orientation films.

33. A liquid crystal display device according to claim 28, further comprising optical compensation phase films.

34. A liquid crystal display device according to claims 1, 2 or 28, wherein the initial orientation direction on the one orientation film side extends transversely to the initial orientation direction on the other orientation film side.

35. A liquid crystal display device comprising:

a pair of insulating substrates disposed opposite each other;

a pair of orientation films formed over the insulating substrates;

a liquid crystal composition held between the pair of orientation films;

pixel electrodes and counter electrodes arranged to apply a lateral electric field almost parallel to surfaces of the substrates; and a pair of polarizers disposed with the pair of substrates held therebetween;

wherein the liquid crystal composition has a positive dielectric anisotropy;

wherein an initial orientation angle $\beta 1$ between an in-plane direction of the lateral electric field and an initial orientation direction on one orientation film side and an initial orientation angle $\beta 2$ between the in-plane direction of the lateral electric field and an initial orientation direction on the other orientation film side have opposite signs and are in the relationship of $|\beta 1 + \beta 2| \leq 20$ degrees;

wherein an angle between the in-plane direction of the lateral electric field and a polarizing axis of one of the polarizers is almost zero;

wherein optical compensation phase films are arranged on one of the upper side, lower side and both sides of the pair of substrates;

wherein at least two of the optical compensation phase films are provided, with at least one film being arranged between one of the substrates and the polarizer and at least one other film being arranged between the other substrate and the polarizer; and wherein an angle $\gamma 1$ between one phase lagging axis of the optical compensation phase films and the in-plane direction of the lateral electric field, and an angle $\gamma 2$ between an other phase lagging axis and the in-plane direction of the lateral electric field are $\gamma 1 = \beta 1/2$ and $\gamma 2 = \beta 2/2$.

36. A liquid crystal display device according to claim 35, wherein 35 degrees $\leq |\beta 1| < 90$ degrees and 35 degrees $\leq |\beta 2| < 90$ degrees.

* * * * *